United States Patent
Iida et al.

(10) Patent No.: US 11,993,669 B2
(45) Date of Patent: May 28, 2024

(54) FOAMABLE RESIN PARTICLES AND METHOD OF PRODUCING SAME, AND FOAMED MOLDED BODY

(71) Applicant: KANEKA CORPORATION, Osaka (JP)

(72) Inventors: Atsushi Iida, Hyogo (JP); Mitsuhiro Tamura, Hyogo (JP); Yoichi Ohara, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 594 days.

(21) Appl. No.: 17/170,101

(22) Filed: Feb. 8, 2021

(65) Prior Publication Data

US 2021/0163646 A1    Jun. 3, 2021

Related U.S. Application Data

(63) Continuation of application No. PCT/JP2019/031384, filed on Aug. 8, 2019.

(30) Foreign Application Priority Data

Aug. 9, 2018   (JP) ................................. 2018-150636

(51) Int. Cl.
  *C08F 212/10*   (2006.01)
  *C08J 9/18*     (2006.01)

(52) U.S. Cl.
  CPC .............. *C08F 212/10* (2013.01); *C08J 9/18* (2013.01); *C08J 2203/10* (2013.01); *C08J 2325/12* (2013.01)

(58) Field of Classification Search
  CPC ......... C08F 212/10; C08F 212/08; C08J 9/18; C08J 2203/10; C08J 2325/12; C08J 9/141; C08J 2201/034; C08J 2203/14; C08J 9/232
  See application file for complete search history.

(56) References Cited

FOREIGN PATENT DOCUMENTS

| | | | |
|---|---|---|---|
| CN | 103998514 A | | 8/2014 |
| JP | H11255945 A | | 9/1999 |
| JP | 2008231175 A | * | 10/2008 |
| JP | 2013053232 A | | 3/2013 |
| JP | 2013112765 A | | 6/2013 |
| JP | 2015151486 A | | 8/2015 |
| JP | 2016130282 A | | 7/2016 |

(Continued)

OTHER PUBLICATIONS

International Preliminary Report on Patentability issued for PCT/JP2019/031384, issued Feb. 9, 2021 (15 pages).

(Continued)

*Primary Examiner* — K. Boyle
(74) *Attorney, Agent, or Firm* — Osha Bergman Watanabe & Burton LLP

(57) ABSTRACT

Expandable resin particles that have a reduced VOC content, a method of producing the expandable resin particles, and a foamed molded product that has reduced VOC emission are provided. The expandable resin particles contain a base material resin containing, as a structural unit, a styrene unit and an acrylonitrile unit and an expanding agent. The expandable resin particles have a styrene content and an ethylbenzene content each of which is not more than a specific amount.

3 Claims, 1 Drawing Sheet

(56) References Cited

FOREIGN PATENT DOCUMENTS

| | | | |
|---|---|---|---|
| JP | 2016164213 | A | 9/2016 |
| JP | 2017052894 | A | 3/2017 |
| JP | 2017137449 | A | 8/2017 |

OTHER PUBLICATIONS

International Search Report issued for PCT/JP2019/031384, mailed Oct. 21, 2019 (2 pages).
Office Action issued in counterpart Chinese Patent Application No. CN 201980052954.8 dated Jul. 20, 2022, with translation (18 pages).

* cited by examiner

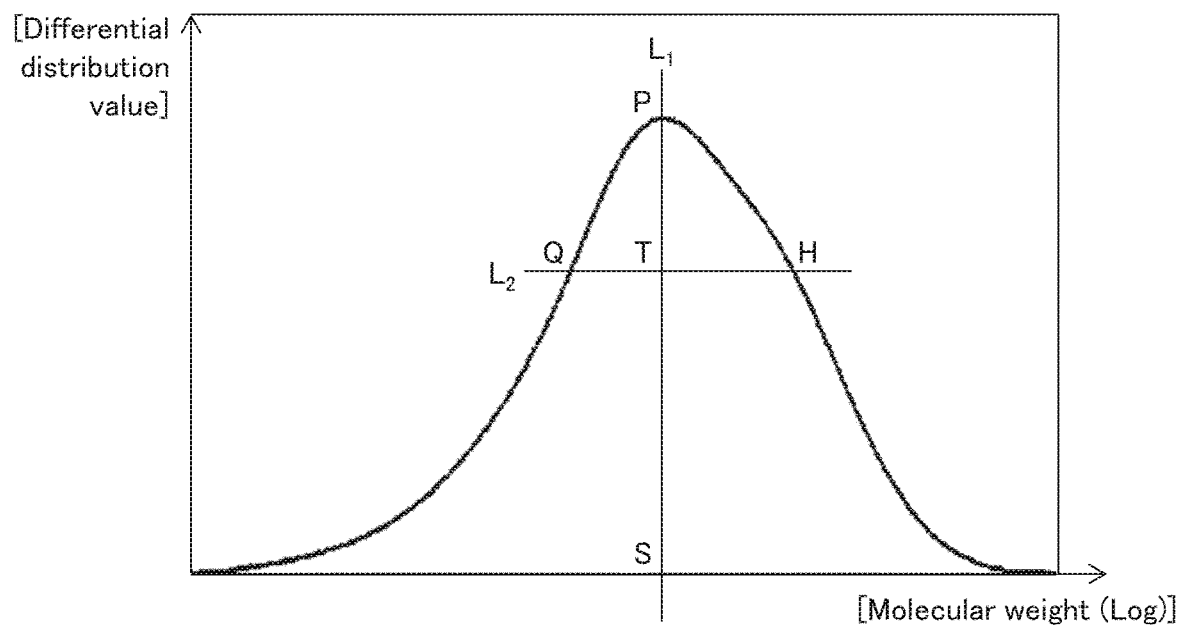

FOAMABLE RESIN PARTICLES AND METHOD OF PRODUCING SAME, AND FOAMED MOLDED BODY

TECHNICAL FIELD

One or more embodiments of the present invention relate to expandable resin particles and a method of producing the expandable resin particles, and a foamed molded product.

BACKGROUND

Expandable polystyrene resin particles are a well-known type of expandable resin particles. Expandable polystyrene resin particles are widely utilized due to having easy moldability into a molded product by in-mold expansion molding and thus being inexpensive.

Foamed molded products made of expandable polystyrene resin particles are excellent in lightweight property and heat insulating property but high in emission, per unit time, of volatile organic compounds (hereinafter, also referred to as "VOCs" which is an acronym of "volatile organic compounds") contained in the foamed molded products. Accordingly, use of such a foamed molded product in the fields of automobiles, building materials, and the like, in which standards on VOCs are strict, involves a treatment such as drying the foamed molded product for several days. Such a treatment contributes to cost increase.

Techniques in response to the above issue have been disclosed in Patent Literatures 1 to 3. Patent Literature 1 discloses a method of producing expandable polystyrene-based resin particles, characterized by polymerizing a styrene-based monomer with use of 1,1-bis(t-butylperoxy)-cyclohexane or 1,1-bis(t-amylperoxy)-3,3,5-trimethylcyclohexane as a polymerization initiator.

Patent Literatures 2 and 3 each disclose expandable resin particles comprising (i) a copolymer consisting of a styrene monomer, an acrylonitrile monomer, and an alpha-methylstyrene monomer and (ii) an expanding agent. The techniques disclosed in Patent Literatures 2 and 3 use 1,1-bis(t-amylperoxy)-3,3,5-trimethylcyclohexane as a polymerization initiator.

PATENT LITERATURE

[Patent Literature 1]
Japanese Patent Application Publication, Tokukai, No. 2017-052894
[Patent Literature 2]
Japanese Patent Application Publication, Tokukai, No. 2015-151486
[Patent Literature 3]
Japanese Patent Application Publication, Tokukai, No. 2016-164213

In terms of VOC reduction, the above-described known techniques are improvements compared with expandable resin particles which were common on the technology level at the time of development of the known techniques. However, the level of interest in VOC reduction is high in the market, and the above-described known techniques therefore still have room for improvement in terms of VOC reduction.

SUMMARY

One or more embodiments of the present invention are accomplished in response to the above issue, and one or more embodiments of the present invention provide novel expandable resin particles that have a reduced VOC content, a method of producing the expandable resin particles, and a novel foamed molded product that has reduced VOC emission.

The inventors of one or more embodiments of the present invention conducted a diligent study in order to complete one or more embodiments of the present invention.

Specifically, expandable resin particles in accordance with one or more embodiments of the present invention are expandable resin particles, containing: a base material resin containing, as a structural unit, a styrene unit and an acrylonitrile unit; and an expanding agent, the expandable resin particles having a styrene content of not more than 20 ppm and an ethylbenzene content of not more than 130 ppm.

A foamed molded product in accordance with one or more embodiments of the present invention is a foamed molded product, from which styrene is released in an amount of not more than 1.5 µg and ethylbenzene is released in an amount of not more than 3.0 µg, wherein each of the amount of the styrene released from the foamed molded product and the amount of the ethylbenzene released from the foamed molded product is an amount released in a case where the foamed molded product in a size of 100 mm in height×100 mm in width×15 mm in thickness is left under a condition of 60° C. for 2 hours.

A method of producing expandable resin particles in accordance with one or more embodiments of the present invention is a method of producing expandable resin particles, including: a copolymerization step of copolymerizing monomers so as to obtain a copolymer, the monomers including a styrene monomer and an acrylonitrile monomer; and an expanding agent impregnation step of impregnating the copolymer with an expanding agent, in the copolymerization step, a polymerization initiator containing a polymerization initiator (X) having a structure represented by Formula (1) below being used, the polymerization initiator (X) being used in an amount of not less than 0.25 parts by weight and not more than 0.90 parts by weight relative to 100 parts by weight of the monomers, the copolymerization step including a first polymerization step and a second polymerization step which are successive steps and differ from each other in polymerization temperature, the second polymerization step being carried out at any point in time after a polymerization conversion rate reaches 85%, a polymerization temperature in the second polymerization step being 110° C. to 120° C., a length of polymerization time in the second polymerization step being 3 hours to 8 hours,

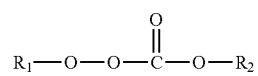

Formula (1)

wherein $R_1$ and $R_2$ are each independently hydrogen, a branched, cyclic, or linear alkyl group having 1 to 12 carbon atoms, or an aryl group having 6 to 12 carbon atoms, and may be identical to or different from each other.

Advantageous Effects of Invention

According to one or more embodiments of the present invention, it is possible to provide expandable resin particles that have a reduced VOC content, a method of producing the expandable resin particles, and a foamed molded product that has reduced VOC emission.

BRIEF DESCRIPTION OF THE DRAWINGS

FIG. 1 is a graph showing an example of a GPC measurement chart of a base material resin.

DETAILED DESCRIPTION OF THE EMBODIMENTS

The following description will discuss one or more embodiments of the present invention. The present invention is not, however, limited to these embodiments. One or more embodiments of the present invention are not limited to the arrangements described below, but may be altered within the scope of the claims by a person skilled in the art. One or more embodiments of the present invention also encompass, in their technical scope, any embodiments derived by combining technical means disclosed in differing embodiments and Examples. Further, it is possible to form a new technical feature by combining the technical means disclosed in the respective embodiments. All academic and patent documents cited in the present specification are incorporated herein by reference. Any numerical range expressed as "A to B" in the present specification means "not less than A and not more than B (i.e., a range from A to B which includes both A and B)" unless otherwise stated.

[1. Technical Idea of the Present Invention]

The inventors of one or more embodiments of the present invention carried out diligent study in order to provide expandable resin particles having a reduced VOC content, and independently discovered the following issue. Specifically, none of polymerization initiators used in the Examples in Patent Literatures 1 to 3 described above has a structure represented by the above Formula (1). In such conventional techniques, even with an increase in amount of the polymerization initiator used, there is a limit to an extent to which a reduction in VOC content in obtained expandable resin particles can be achieved, and the obtained expandable resin particles contain a certain amount of a VOC. As such, a foamed molded product obtained using the expandable resin particles disclosed in each of Patent Literatures 1 to 3 requires a long-term drying treatment in order to meet required standards in the fields of automobiles and building materials on amounts of VOCs released, and thus still has room for improvement in terms of VOC reduction and productivity.

After diligent study, the inventors of one or more embodiments of the present invention found for the first time that use of a particular polymerization initiator makes it possible to obtain expandable resin particles having a reduced VOC content, and thus completed one or more embodiments of the present invention.

[2. Expandable Resin Particles]

Expandable resin particles in accordance with one or more embodiments of the present invention are expandable resin particles, containing: a base material resin containing, as a structural unit, a styrene unit and an acrylonitrile unit; and an expanding agent, the expandable resin particles having a styrene content of not more than 20 ppm and an ethylbenzene content of not more than 130 ppm.

Due to having the above arrangement, the expandable resin particles in accordance with one or more embodiments of the present invention advantageously have a reduced VOC content. Accordingly, the expandable resin particles in accordance with one or more embodiments of the present invention advantageously allow providing a foamed molded product that has reduced VOC emission. Specifically, the expandable resin particles in accordance with one or more embodiments of the present invention advantageously allow providing a foamed molded product from which styrene is released in an amount of not more than 1.5 µg and ethylbenzene is released in an amount of not more than 3.0 µg. A foamed molded product having reduced VOC emission immediately after production is able to meet standards on VOCs required in the fields of automobiles, building materials, and the like, without further requiring a high-temperature, long-time drying step. Accordingly, the expandable resin particles in accordance with one or more embodiments of the present invention advantageously allow providing a foamed molded product with high productivity.

Note that with the expandable resin particles in accordance with one or more embodiments of the present invention, the provision of the foamed molded product is achieved by (i) producing expanded particles by a known method with use of the expandable resin particles and (ii) performing foam molding by a known method with use of the expanded particles.

In the present specification, "expandable resin particles in accordance with one or more embodiments of the present invention" may be simply referred to as "the present expandable resin particles". In other words, the term "the present expandable resin particles" is intended to mean one or more embodiments of expandable resin particles in the present invention.

(2-1. VOC)

A VOC means, in a broad sense, "any organic compound that is in a gaseous state at the time of its emission or dispersal into the atmosphere from an outlet" as defined by Air Pollution Control Act of Japan. In each technical field, compounds that should be regulated as VOCs are designated. For example, the Ministry of Health, Labour and Welfare of Japan defines guideline values of indoor concentration with respect to the following substances: formaldehyde, acetaldehyde, toluene, ethylbenzene, xylene, styrene, nonanal, tetradecane, di-n-butyl phthalate, di-2-ethylhexyl phthalate, p-dichlorobenzene, chlorpyrifos, diazinon, and fenobucarb. Japan Automobile Manufacturers Association, Inc. also regulates concentrations of the following substances in an interior of an automobile: formaldehyde, acetaldehyde, toluene, ethylbenzene, xylene, styrene, tetradecane, di-n-butyl phthalate, and di-2-ethylhexyl phthalate.

In the present specification, a "VOC" means "an organic compound (a) which is in a gaseous state at the time of its emission and dispersal into the atmosphere and (b) for which a guideline value of indoor concentration is defined by the Ministry of Health, Labour and Welfare of Japan, among compounds that may be contained in expandable resin particles or a foamed molded product." Specifically, "VOC" in the present specification means styrene and ethylbenzene. Further, in the present specification, the following four compounds are defined as "total VOC": styrene, ethylbenzene, acrylonitrile, and alpha-methylstyrene. Note that acrylonitrile and alpha-methylstyrene are organic compounds which are in a gaseous state at the time of their emission and dispersal into the atmosphere but for which the Ministry of Health, Labour and Welfare of Japan does not define guideline values of indoor concentration.

(2-2. Base Material Resin)

The base material resin contained in the present expandable resin particles contains, as a structural unit, a styrene unit and an acrylonitrile unit. In the present specification, "styrene unit" is a structural unit derived from a styrene monomer, and "acrylonitrile unit" is a structural unit derived from an "acrylonitrile monomer".

Since the base material resin contained in the present expandable resin particles contains the acrylonitrile unit as a structural unit, binding force between polymer chains is sufficiently strong. Accordingly, a foamed molded product which can be produced from the expandable resin particles is advantageously excellent in gas barrier property and thus capable of achieving a reduced rate of VOC emission.

The base material resin contained in the present expandable resin particles may further contain an alpha-methylstyrene unit as a structural unit. This arrangement raises a glass transition temperature of the base material resin, so that the expandable resin particles allows providing a foamed molded product having a sufficient heat resistance. In the present specification, "alpha-methylstyrene unit" is a structural unit derived from an alpha-methylstyrene monomer.

The base material resin may contain, as a structural unit, a structural unit other than the styrene unit, the acrylonitrile unit, and the alpha-methylstyrene unit. The base material resin may further contain, as a structural unit, for example, (i) an olefin-based monomer, (ii) a structural unit derived from a styrene-based monomer other than styrene and alpha-methylstyrene, and (iii) a structural unit derived from an acrylic acid ester-based monomer.

Examples of the olefin-based monomer include ethylene, propylene, butene, and butadiene.

Examples of the styrene-based monomer other than styrene and alpha-methylstyrene include a styrene-based derivative such as paramethylstyrene, t-butylstyrene, and chlorstyrene.

Examples of the acrylic acid ester-based monomer include acrylic acid alkyl esters such as methyl acrylate and butyl acrylate.

It is preferable that in the base material resin contained in the present expandable resin particles, (a) an amount of the styrene unit be not less than 60 parts by weight and not more than 79 parts by weight, an amount of the acrylonitrile unit be not less than 21 parts by weight and not more than 40 parts by weight, and an amount of the alpha-methylstyrene unit be not less than 0 part by weight and not more than 15 parts by weight, and (b) a total amount of the styrene unit, the acrylonitrile unit, and the alpha-methylstyrene unit be 100 parts by weight.

It is more preferable that in the base material resin contained in the present expandable resin particles, (a) the amount of the styrene unit be not less than 60 parts by weight and not more than 75 parts by weight, the amount of the acrylonitrile unit be not less than 21 parts by weight and not more than 27 parts by weight, and the amount of the alpha-methylstyrene unit be not less than 3 parts by weight and not more than 15 parts by weight, and (b) the total amount of the styrene unit, the acrylonitrile unit, and the alpha-methylstyrene unit be 100 parts by weight.

The amount of the styrene unit may be not less than 65 parts by weight and not more than 75 parts by weight, not less than 70 parts by weight and not more than 73 parts by weight. In a case where the amount of the styrene unit is not less than 60 parts by weight, the expandable resin particles are excellent in moldability. In a case where the amount of the styrene unit is not more than 79 parts by weight, the expandable resin particles allow providing a foamed molded product excellent in heat resistance.

The amount of the acrylonitrile unit may be not less than 23 parts by weight and not more than 25 parts by weight. In a case where the amount of the acrylonitrile unit is not less than 21 parts by weight, the expandable resin particles allow providing a foamed molded product which (a) is excellent in gas barrier property and thus releases a reduced amount of styrene as a VOC, and (b) is excellent in heat resistance. In a case where the amount of the acrylonitrile unit is not more than 40 parts by weight, the expandable resin particles are advantageously excellent in moldability and produced with an increased polymerization stability during the production of the expandable resin particles.

The amount of the alpha-methylstyrene unit may be not less than 4 parts by weight and not more than 10 parts by weight, not less than 4 parts by weight and not more than 7 parts by weight. It is characteristic of alpha-methylstyrene to have a methyl group at an alpha position, undergo a resulting strong steric hindrance, and thus have poor reactivity. Alpha-methylstyrene is also characterized in that in a case where alpha-methylstyrene is contained in the base material resin, an alpha-methylstyrene site in the base material resin is easily decomposed. Accordingly, in a case where the amount of the alpha-methylstyrene unit in the base material resin exceeds 0 part by weight, in other words, in a case where alpha-methylstyrene is used in production of the base material resin, control of polymerization is advantageously easy during production of the expandable resin particles because a polymerization speed is not too fast. Further, in a case where the amount of the alpha-methylstyrene unit is not more than 15 parts by weight, the following results (a) to (c) are obtained. (a) The obtained base material resin is not easily decomposed, and the expandable resin particles therefore allow providing a foamed molded product excellent in flame retardancy. (b) Reactivity during a polymerization reaction is not deteriorated, and an average molecular weight of the obtained base material resin is therefore not too low. (c) The expandable resin particles have a low content of styrene as a VOC.

(2-3. Expanding Agent)

Examples of the expanding agent contained in the present expandable resin particles include, but are not limited to, a volatile expanding agent such as (a) aliphatic hydrocarbons such as propane, isobutane, normal butane, isopentane, normal pentane, and neopentane cyclohexane and (b) fluorinated hydrocarbons having an ozone depleting potential of 0 (zero), such as difluoroethane and tetrafluoroethane. These expanding agents may be used alone or in combination of two or more kinds.

An amount of the expanding agent in the present expandable resin particles may be not less than 2 parts by weight and not more than 7 parts by weight, not less than 3 parts by weight and not more than 6 parts by weight, or not less than 4 parts by weight and not more than 5 parts by weight, relative to 100 parts by weight of the expandable resin particles. With this arrangement, (a) expanded particles having an expansion ratio of not less than 40 times can be produced with use of the expandable resin particles, and (b) the expandable resin particles allow providing a foamed molded product excellent in heat resistance and flame retardancy.

(2-4. Other Additives)

The present expandable resin particles may optionally contain another additive(s) in addition to the base material resin and the expanding agent. Examples of the another additive(s) include solvents, plasticizing agents, cell adjusting agents, flame retarders, auxiliary flame retarders, heat ray radiation inhibitors, pigments, dyes, and antistatic agents.

The plasticizing agent can be a high boiling point plasticizing agent having a boiling point of not lower than 200° C. Examples of such a plasticizing agent include (a) fatty acid glycerides such as triglyceride stearate, triglyceride palmitate, triglyceride laurate, diglyceride stearate, monoglyceride stearate, (b) vegetable oils such as coconut oil, palm oil, and palm kernel oil, (c) aliphatic esters such as dioctyl adipate and dibutyl sebacate, and (d) organic hydrocarbons such as liquid paraffin and cyclohexane. In a case where the expandable resin particles contain a large amount of any one(s) of these substances listed as the plasticizing agent, a foamed molded product that can be provided with use of the expandable resin particles tends to deteriorate in heat resistance. As such, an amount of the plasticizing agent in the present expandable resin particles can be appropriately set so that a foamed molded product which can be provided with use of the expandable resin particles has a desired heat resistance.

The present expandable resin particles may contain a cell adjusting agent in order to adjust a cell diameter of the foamed molded product that can be provided with use of the expandable resin particles. Examples of the cell adjusting agent include (a) aliphatic bisamides such as methylenebisstearylamide and ethylenebisstearylamide and (b) polyethylene wax. An amount of the cell adjusting agent in the present expandable resin particles may be less than 0.1 parts by weight with respect to 100 parts by weight of the expandable resin particles. With the above arrangement, a foamed molded product which can be provided with use of the expandable resin particles does not have a deterioration in heat resistance and an increase in VOC emission, each of which may otherwise be caused in a case where the foamed molded product has fine cells.

The present expandable resin particles may contain a flame retarder in order for a foamed molded product that can be provided with use of the expandable resin particles to have flame retardancy. The flame retarder may be a bromine flame retarder. Examples of the bromine flame retarder include 2,2-bis[4'-(2",3"-dibromo-2"-methylpropyloxy)-,3', 5'-dibromophenyl]-propane, hexabromocyclododecane, tetrabromocyclooctane, brominated polystyrene, and brominated butadiene-styrene block copolymer. In terms of easily imparting flame retardancy to a foamed molded product that can be provided with use of the expandable resin particles, the present expandable resin particles may contain 2,2-bis[4'-(2",3"-dibromo-2"-methylpropyloxy)-,3',5'-dibromophenyl]-propane as the flame retarder. Note that 2,2-bis[4'-(2",3"-dibromo-2"-methylpropyloxy)-,3',5'-dibromophenyl]-propane is also referred to as tetrabromobisphenol A-bis(2,3-dibromo-2-methylpropyl)ether.

An amount of the flame retarder in the present expandable resin particles may be not less than 1.5 parts by weight and not more than 3.0 parts by weight, or not less than 1.8 parts by weight and not more than 2.5 parts by weight, relative to 100 parts by weight of the expandable resin particles. In a case where the amount of the flame retarder in the expandable resin particles is not less than 1.5 parts by weight relative to 100 parts by weight of the expandable resin particles, a foamed molded product that can be provided with use of the expandable resin particles can have a sufficient flame retardancy. In a case where the amount of the flame retarder in the expandable resin particles is not more than 3.0 parts by weight relative to 100 parts by weight of the expandable resin particles, the expandable resin particles have a reduced VOC content and are excellent in moldability.

In a case where the present expandable resin particles contain the flame retarder, it is preferable that the expandable resin particles further contain an auxiliary flame retarder. As the auxiliary flame retarder, a radical generating agent such as a peroxide may be used. Examples of such a radical generating agent include dicumyl peroxide, t-butylperoxy benzoate, 2,3-dimethyl-2,3-diphenylbutane, and 3,4-dialkyl-3,4-diphenylhexane. In terms of providing a foamed molded product that has little effect on a polymerization reaction and has a good flame retardancy, the present expandable resin particles may contain, as the auxiliary flame retarder, a peroxide having a ten-hour half-life temperature of not less than 130° C. and not more than 150° C., and may contain dicumyl peroxide.

An amount of the auxiliary flame retarder in the present expandable resin particles may be less than 0.3 parts by weight and not more than 1.5 parts by weight with respect to 100 parts by weight of the expandable resin particles. In a case where the amount of the auxiliary flame retarder in the expandable resin particles is not less than 0.3 parts by weight relative to 100 parts by weight of the expandable resin particles, a foamed molded product that can be provided with use of the expandable resin particles has a sufficient flame retardancy. In a case where the amount of the auxiliary flame retarder in the expandable resin particles is not more than 1.5 parts by weight relative to 100 parts by weight of the expandable resin particles, a foamed molded product that can be provided with use of the expandable resin particles has a sufficient heat resistance.

(2-5. Physical Properties)
(VOC Content in Expandable Resin Particles)

The present expandable resin particles have a styrene content of not more than 20 ppm and an ethylbenzene content of not more than 130 ppm. The styrene content in the present expandable resin particles may be not more than 10 ppm, not more than 5 ppm, or 0 ppm, that is, not more than a detection limit in a measurement method which will be described later. The ethylbenzene content in the present expandable resin particles may be not more than 100 ppm, not more than 85 ppm, or not more than 70 ppm. The above arrangement allows a foamed molded product that can be provided with use of the expandable resin particles to have reduced VOC emission into the environment and thus have a reduced adverse effect on the human body. Note here that the "styrene content in the expandable resin particles" is intended to mean a content of a styrene monomer in the expandable resin particles, and the "ethylbenzene content in the expandable resin particles" is intended to mean a content of an ethylbenzene monomer in the expandable resin particles. Examples of a method of measuring contents of styrene and ethylbenzene (i.e., VOC content) in the expandable resin particles include a measurement method that uses gas chromatography. A concrete method will be described later with reference to Examples.

A total VOC content in the present expandable resin particles may be not more than 500 ppm, not more than 400 ppm, or not more than 300 ppm. The above arrangement reduces an amount of total VOC released into the environment from a foamed molded product that can be provided with use of the expandable resin particles. The total VOC content in the expandable resin particles can be measured by a measuring method similar to that of a VOC content in the expandable resin particles. A concrete method will be described later with reference to Examples.

(Weight Average Molecular Weight of Base Material Resin)

In the present expandable resin particles, the base material resin may have a weight average molecular weight of not less than 150000 and not more than 250000, or not less than 150000 and not more than 220000. In a case where the weight average molecular weight of the base material resin is not less than 150000, a foamed molded product that can be provided with use of the expandable resin particles has enough strength, flame retardancy, and heat resistance. In a case where the weight average molecular weight of the base material resin is not more than 250000, the expandable resin particles have a good moldability. Examples of a method of measuring the weight average molecular weight of the base material resin include a measurement method that uses gel permeation chromatography (also referred to as GPC).

(TH/TQ Ratio of Base Material Resin)

The following description will discuss a TH/TQ ratio of the base material resin. With respect to the base material resin, GPC measurement is carried out using gel permeation chromatography to obtain a GPC measurement chart. The GPC measurement chart is a chart indicative of a relationship between a molecular weight and a differential distribution value, and is obtained in the form of a graph whose horizontal axis represents molecular weight and whose vertical axis represents differential distribution value. Note that the horizontal axis is expressed in logarithm (Log). An example of the GPC measurement chart of the base material resin is illustrated in FIG. 1.

FIG. 1 shows an example of the GPC measurement chart of the base material resin. On a GPC curve in the GPC measurement chart, a point where the integral distribution value is highest is referred to as a peak top and indicated as a point P as shown in FIG. 1. Then, a line $L_1$ is drawn so as to pass through the point P (peak top) and be perpendicular to the horizontal axis of the graph. An intersection of the line $L_1$ and the GPC curve is the point P, and an intersection of the line $L_1$ and the horizontal axis of the graph is referred to as a point S. With respect to a segment PS, a point that is distant from the point P by a length equivalent to ⅔ of a length of the segment PS is defined as a point T. That is, a length of the segment ST is twice a length of the segment PT. Then, a line $L_2$ is drawn so as to pass through the point T and be parallel to the horizontal axis of the graph. Of two intersections between the line $L_2$ and the GPC curve, the intersection on a left side (low molecular weight side) of the line $L_1$ is defined as a point Q, and the intersection on a right side (high molecular weight side) of the line $L_1$ is defined as a point H. A ratio of a length of a segment TH to a length of a segment TQ is referred to as a TH/TQ ratio. A greater TH/TQ ratio indicates a greater amount of higher molecular weight components contained in the base material resin. Since the expanding agent does not affect the TH/TQ ratio, the TH/TQ ratio of the base material resin can be regarded as the TH/TQ ratio of the expandable resin particles. In other words, a TH/TQ ratio obtained by analyzing the expandable resin particles can be regarded as a TH/TQ ratio of the base material resin contained in the expandable resin particles. Conditions and the like for the GPC measurement of the base material resin with use of gel permeation chromatography will be described in detail in Examples below.

The TH/TQ ratio of the base material resin may be less than 1.20, may be not more than 1.19, may be not more than 1.18, may be not more than 1.17, may be not more than 1.16, may be not more than 1.15, and may be not more than 1.14. A low TH/TQ ratio of the base material resin contained in the expandable resin particles is a characteristic observed in a case in which a polymerization initiator having a structure represented by Formula (1) is used. In other words, in expandable resin particles produced using a polymerization initiator containing a polymerization initiator (X) having a structure represented by Formula (1), a base material resin may have a TH/TQ ratio within the above-described range. That is, in expandable resin particles produced by a production method described later in a section [3. Method of producing expandable resin particles], a base material resin may have a TH/TQ ratio within the above-described range. It can be also said that expandable resin particles which contain an acrylonitrile unit as a structural unit and in which a base material resin has a TH/TQ ratio of less than 1.20 tend to have a reduced VOC content. It can be also said that expandable resin particles which contain an acrylonitrile unit as a structural unit and in which a base material resin has a TH/TQ ratio of less than 1.20 tend to allow providing a molded product having reduced VOC emission.

(Water Content in Expandable Resin Particles)

The present expandable resin particles may have a water content of not less than 1%, 1.5% to 3.0%, or 1.5% to 2.0%. In a case where the water content in the present expandable resin particles is not less than 1%, a foamed molded product that can be provided with use of the expandable resin particles has a sufficient flame retardancy. Note here that water is incompatible with the expandable resin particles. In a case where water is contained in the expandable resin particles, the water is distributed in the form of spheres within the expandable resin particles. When the water within the expandable resin particles is removed by drying the expandable resin particles, spaces (also referred to as voids) derived from the water are left in the expandable resin particles. These spaces serve as nucleating points when the expandable resin particles are caused to expand. Accordingly, expanding the expandable resin particles having the spaces yields expanded particles that tend to have uniform cells due to the spaces, i.e., the nucleating points. However, in a case where the expandable resin particles have a high water content, expanded particles obtained from the expandable resin particles may have fine cells. The fine cells in the expanded particles may lead to problems such as a deterioration in heat resistance of a foamed molded product that can be provided with use of the expandable resin particles and an increase in VOC emission from the foamed molded product. Examples of a method of measuring the water content in the present expandable resin particles include a measurement method that uses Karl Fischer coulometric titration. A concrete method will be described later with reference to Examples.

In production of the expandable resin particles, no change occurs in composition of the base material resin. In expanded particles produced with use of the expandable resin particles, the expandable resin particles have changed in structure but not in composition. Further, in a foamed molded product produced with use of the expanded particles produced with use of the expandable resin particles, the expanded particles have changed in structure but not in composition. Therefore, (i) types of structural units, (ii) contents of the structural units, (iii) a weight average molecular weight, and (iv) a TH/TQ ratio which are obtained from an analysis of the expandable resin particles, the expanded particles, or the foamed molded product can be respectively assumed to be (i) types of structural units contained in the base material resin which is a raw material of the expandable resin particles, the expanded particles, or the foamed molded product, (ii) contents of the structural units, (iii) a weight average molecular weight of the base material resin, and (iv) a TH/TQ ratio of the base material resin.

A weight average molecular weight of the expandable resin particles, the expanded particles, or the foamed molded product can be obtained by carrying out measurement with use of gel permeation chromatography (also referred to as GPC) with respect to the expandable resin particles, the expanded particles, or the foamed molded product. A TH/TQ ratio of the expandable resin particles, the expanded particles, or the foamed molded product can be calculated by a method similar to the method of calculating a TH/TQ ratio of the base material resin, except for obtaining a GPC measurement chart by carrying out GPC measurement with use of gel permeation chromatography with respect to the expandable resin particles, the expanded particles, or the foamed molded product.

[3. Method of Producing Expandable Resin Particles]

A method of producing expandable resin particles in accordance with one or more embodiments of the present invention is a method of producing expandable resin particles, including: a copolymerization step of copolymerizing monomers so as to obtain a copolymer, the monomers including a styrene monomer and an acrylonitrile monomer; and an expanding agent impregnation step of impregnating the copolymer with an expanding agent, in the copolymerization step, a polymerization initiator containing a polymerization initiator (X) having a structure represented by the Formula (1) above being used, the polymerization initiator (X) being used in an amount of not less than 0.25 parts by weight and not more than 0.90 parts by weight relative to 100 parts by weight of the monomers, the copolymerization step including a first polymerization step and a second polymerization step which are successive steps and differ from each other in polymerization temperature, the second polymerization step being carried out at any point in time after a polymerization conversion rate reaches 85%, a polymerization temperature in the second polymerization step being 110° C. to 120° C., a length of polymerization time in the second polymerization step being 3 hours to 8 hours, wherein $R_1$ and $R_2$ are each independently hydrogen, a branched, cyclic, or linear alkyl group having 1 to 12 carbon atoms, or an aryl group having 6 to 12 carbon atoms, and may be identical to or different from each other.

Due to having the above arrangement, the method of producing expandable resin particles in accordance with one or more embodiments of the present invention advantageously allows providing the expandable resin particles described in the section [2. Expandable resin particles]. In other words, the method of producing expandable resin particles in accordance with one or more embodiments of the present invention is suitably used for providing the expandable resin particles described in the section [2. Expandable resin particles]. Further, expandable resin particles produced by the method of producing expandable resin particles in accordance with one or more embodiments of the present invention advantageously allow providing a foamed molded product from which styrene is released in an amount of not more than 1.5 µg and ethylbenzene is released in an amount of not more than 3.0 µg. Note that the "copolymer" in the present production method corresponds to the "base material resin" contained in the expandable resin particles described in the section [2. Expandable resin particles].

In the present specification, a "method of producing expandable resin particles in accordance with one or more embodiments of the present invention" may be simply referred to as "the present production method". In other words, the term "the present production method" is intended to mean one or more embodiments of a method of producing expandable resin particles in the present invention.

Steps relating to the present production method will be described below. For matters other than those detailed below, reference is made to the descriptions in the section [2. Expandable resin particles] as necessary. The present expandable resin particles, i.e., the expandable resin particles described in the section [2. Expandable resin particles], may be produced by the present production method, but can be produced by a method other than the present production method. That is, the method of producing the present expandable resin particles is not limited to aspects of the present production method described below.

(3-1. Copolymerization Step)

A styrene monomer may contain a small amount of an ethylbenzene monomer which is used in the process of producing the styrene monomer. The styrene monomer used in the present production method contains as small an amount of an ethylbenzene monomer as possible. For example, an amount of the ethylbenzene monomer in the styrene monomer may be not more than 130 ppm, not more than 100 ppm, not more than 85 ppm, or not more than 70 ppm. This arrangement allows reducing an ethylbenzene content in the obtained expandable resin particles.

In the copolymerization step of the present production method, a method of copolymerizing the monomers including the styrene monomer and the acrylonitrile monomer is not particularly limited, and can be a known polymerization method. The copolymerization step may be a suspension polymerization method in which polymerization is carried out in an aqueous suspension. Generally, suspension polymerization is superior to mass polymerization in removal of heat of polymerization (i.e., heat release). The copolymerization step will be described below with reference to an example case in which the suspension polymerization method is employed.

In the present specification, "aqueous suspension" refers to a liquid (aqueous solution) in which resin particle, expandable resin particles, and/or a monomer liquid drop are/is dispersed in water or an aqueous solution with use of a stirrer or the like. In the aqueous suspension, (i) a surfactant and a monomer may be dissolved, or (ii) a dispersing agent, a polymerization initiator, a crosslinking agent, a plasticizing agent, a cell adjusting agent, a flame retarder, an auxiliary flame retarder, and the like each of which are insoluble in water may be dispersed. Note that the polymerization initiator, the crosslinking agent, the chain transfer agent, and the polymerization adjusting agent which are used in the copolymerization step constitute a part of the obtained copolymer.

In a case where a seeded suspension polymerization method is employed as a polymerization method, a monomer which is contained in resin particles and serves as a seed is also included as a monomer component.

The copolymerization step is a step of obtaining a copolymer by carrying out the following (Operation i) and (Operation ii) in sequence. (Operation i): Water, a monomer mixture containing a styrene monomer and an acrylonitrile monomer, a dispersing agent, a polymerization initiator, and optionally another additive(s) (a plasticizing agent, a cell adjusting agent, a flame retarder, an auxiliary flame retarder, and the like) are mixed to prepare an aqueous suspension. (Operation ii): Subsequently, the aqueous suspension is then heated to a predetermined temperature to cause a polymerization reaction at the predetermined temperature for a predetermined period, so as to obtain the copolymer. Note that timing for ending the copolymerization step is not particularly limited, but may be, for example, after a rate of conversion of the styrene monomer into a polymer reaches 99%.

Here, the rate of conversion of the styrene monomer into a polymer is calculated as follows:

(The rate of conversion of the styrene monomer into a polymer)=((an amount of the styrene monomer supplied to the aqueous suspension)−(an amount of the styrene monomer remaining in the aqueous suspension))/(the amount of the styrene monomer supplied to the aqueous suspension)

The "amount of the styrene monomer supplied to the aqueous suspension"–the "amount of the styrene monomer remaining in the aqueous suspension" is, in other words, an amount of the styrene monomer contained in the copolymer as a structural unit. The "amount of the styrene monomer remaining in the aqueous suspension" can be measured by, for example, filtering the aqueous suspension with use of a sheet of filter paper or the like and subjecting a resultant residue (which may contain the styrene monomer) on the sheet of filter paper to gas chromatography.

In the above (Operation i) of the copolymerization step, the order by which the water, the monomer mixture containing the styrene monomer and the acrylonitrile monomer, the dispersing agent, the polymerization initiator, and optionally the another additive(s) (the plasticizing agent, the cell adjusting agent, the flame retarder, the auxiliary flame retarder, and the like) are mixed is not particularly limited. It is possible to mix the substances other than the monomer mixture to prepare an aqueous solution and then add the monomer mixture to the aqueous solution to prepare the aqueous suspension.

It is preferable that in the copolymerization step, (a) the styrene monomer, the acrylonitrile monomer, and an alpha-methylstyrene monomer be copolymerized; (b) an amount of the styrene monomer added be not less than 60 parts by weight and not more than 79 parts by weight, an amount of the acrylonitrile monomer added be not less than 21 parts by weight and not more than 40 parts by weight, and an amount of the alpha-methylstyrene monomer added be not less than 0 part by weight and not more than 15 parts by weight; and (c) a total amount of the styrene monomer, the acrylonitrile monomer, and the alpha-methylstyrene monomer added be 100 parts by weight. With this arrangement, as described in the section [2. Expandable resin particles], (a) expanded resin particles are produced with an increased polymerization stability during the production of the expandable resin particles, (b) the obtained expandable resin particles are excellent in moldability, and (c) a foamed molded product that can be provided with use of the expandable resin particles is excellent in heat resistance and gas barrier property.

It is more preferable that in the copolymerization step, (a) the styrene monomer, the acrylonitrile monomer, and the alpha-methylstyrene monomer be copolymerized; (b) the amount of the styrene monomer added be not less than 60 parts by weight and not more than 75 parts by weight, the amount of the acrylonitrile monomer added be not less than 21 parts by weight and not more than 27 parts by weight, and the amount of the alpha-methylstyrene monomer added be not less than 3 parts by weight and not more than 15 parts by weight; and (c) the total amount of the styrene monomer, the acrylonitrile monomer, and the alpha-methylstyrene monomer added be 100 parts by weight. With this arrangement, as described in the section [2. Expandable resin particles], (a) expanded resin particles are produced with an even more increased polymerization stability during the production of the expandable resin particles, (b) the obtained expandable resin particles are even more excellent in moldability, and (c) a foamed molded product that can be provided with use of the expandable resin particles is even more excellent in heat resistance and gas barrier property.

In the copolymerization step, a weight ratio of a resin and water in the aqueous suspension may range from 1.0/0.6 to 1.0/3.0 in terms of a ratio of a weight of the obtained copolymer to a weight of water.

In the copolymerization step, a dispersing agent may be used. Examples of the dispersing agent that may be used in the copolymerization step include (a) poorly water-soluble inorganic salts such as tricalcium phosphate, magnesium pyrophosphate, hydroxyapatite, and kaolin, and (b) water-soluble polymers such as polyvinyl alcohol, methyl cellulose, polyacrylamide, and polyvinylpyrrolidone. In a case where a poorly water-soluble inorganic salt is used as the dispersing agent, it is preferable to use an anionic surfactant such as α-olefin sodium sulfonate or dodecylbenzene sodium sulfonate in combination with the poorly water-soluble inorganic salt (the dispersing agent) in order to achieve an increase in dispersion stability. Such a dispersing agent can be further added to the aqueous suspension as appropriate at any point in time during the copolymerization step.

The dispersing agent is used a varying amount depending on a type of the dispersing agent. In a case where a poorly water-soluble inorganic salt is used as the dispersing agent, the dispersing agent may be used in an amount of not less than 0.1 parts by weight and not more than 1.5 parts by weight relative to 100 parts by weight of water. In a case where a water-soluble polymer is used as the dispersing agent, the dispersing agent may be used in an amount of not less than ppm and not more than 100 ppm in the aqueous suspension. In a case where an anionic surfactant is used in combination with a poorly water-soluble inorganic salt, the anionic surfactant may be used in an amount of not less than ppm and not more than 100 ppm in the aqueous suspension.

In the copolymerization step of the present production method, a chain transfer agent and a polymerization adjusting agent may be further used. Examples of the chain transfer agent include a mercaptan-based compound such as n-octylmercaptan, n-dodecylmercaptan, and t-dodecylmercaptan. Examples of the polymerization adjusting agent include α-methylstyrene dimer, which is generally used for polymerization of an acrylonitrile-styrene-based resin. The chain transfer agent primarily serves to adjust a weight average molecular weight of the copolymer. The polymerization adjusting agent primarily serves to adjust a polymerization speed. α-methylstyrene dimer also contributes to adjustment of the weight average molecular weight of the copolymer, and therefore can be also considered a chain transfer agent.

In the copolymerization step, it is preferable to use α-methylstyrene dimer as the chain transfer agent. With the above arrangement, (a) it is easy to adjust the polymerization speed and the weight average molecular weight of the copolymer, and (b) a foamed molded product that can be provided with use of the expandable resin particles generates no odor.

The chain transfer agent and the polymerization adjusting agent may be used in a total amount of not less than 0.4 parts by weight, not less than 0.5 parts by weight, not less than 0.6 parts by weight, or not less than 1.4 parts by weight relative to 100 parts by weight of the monomers, in terms of easily adjusting (a) the polymerization speed and (b) the weight average molecular weight of the copolymer.

(3-4. Polymerization Initiator)

The polymerization initiator used in the copolymerization step is not particularly limited as long as it contains the polymerization initiator (X) having the structure represented by the above Formula (1). In the copolymerization step, it is possible to use only the polymerization initiator (X) as the polymerization initiator, or use a combination of the polymerization initiator (X) and a polymerization initiator other than the polymerization initiator (X).

The polymerization initiator other than the polymerization initiator (X) can be a radical generating polymerization initiator which is generally used in production (polymerization reaction) of a thermoplastic resin. Examples of such a polymerization initiator include (a) organic peroxides such as benzoyl peroxide, lauroyl peroxide, t-butylperoxy-2-ethylhexanoate, t-butyl perpivalate, di-t-butylperoxy hexahydroterephthalate, 1,1-di(t-butylperoxy)3,3,5-trimethylcyclohexane, 1,1-bis(t-amylperoxy)3,3,5-trimethylcyclohexane, and 1,1-bis(t-butylperoxy)cyclohexane, and (b) azo compounds such as azobisisobutyronitrile and azobisdimethylvaleronitrile. Note that di-t-butylperoxy hexahydroterephthalate is also a bifunctional polymerization initiator. These examples of the polymerization initiator other than the polymerization initiator (X) may be used alone or in combination of two or more kinds. These examples of the polymerization initiator other than the polymerization initiator (X) can be suitably used in the first polymerization step.

The polymerization initiator other than the polymerization initiator (X) may have a ten-hour half-life temperature of not lower than 74° C. and not higher than 94° C. With the above arrangement, in a case where the polymerization initiator other than the polymerization initiator (X) is used in the first polymerization step, the polymerization initiator other than the polymerization initiator (X) is sufficiently decomposed during the first polymerization step. This yields the following results (a) and (b). (a) A state of a polymerization reaction (a polymerization speed and a weight average molecular weight of the copolymer) in the first polymerization step can be suitably controlled by adjusting an amount in which the polymerization initiator other than the polymerization initiator (X) is used. (b) The polymerization initiator other than the polymerization initiator (X) contributes less to a polymerization reaction in the second polymerization step, so that decrease of VOC components due to the polymerization initiator other than the polymerization initiator (X) is less likely to occur.

Examples of the polymerization initiator (X) having the structure represented by the above Formula (1) include t-butylperoxy isopropyl monocarbonate, t-butylperoxy-2-ethylhexyl monocarbonate, t-amylperoxy isopropyl monocarbonate, and t-amylperoxy-2-ethylhexyl monocarbonate. These examples of the polymerization initiator (X) may be used alone or in combination of two or more kinds. The polymerization initiator (X) can be suitably used in the second polymerization step.

Regarding the polymerization initiator (X), in the above Formula (1), $R_1$ and $R_2$ are each independently hydrogen, a branched, cyclic, or linear alkyl group having 1 to 12 (or 1 to 8) carbon atoms, or an aryl group having 6 to 12 (6 to 8, 6 or 7, or 6) carbon atoms, and may be identical to or different from each other. Note that the alkyl group may have a functional group, and the aryl group may have a functional group and/or a hydrocarbon group. Note that the functional group refers to: a group having an atom other than a carbon atom and a hydrogen atom, such as an oxygen atom, a sulfur atom, a nitrogen atom, and a phosphorus atom; an aromatic group; and the like.

In the above Formula (1), $R_1$ may be a branched or linear alkyl group, or a branched alkyl group, among (a) hydrogen, (b) a branched, cyclic, or linear alkyl group, and (c) an aryl group. In the above Formula (1), $R_1$ may be a branched alkyl group having 1 to 7 carbon atoms, a branched alkyl group having 1 to 6 carbon atoms, a branched alkyl group having 1 to 5 carbon atoms, or a branched alkyl group having 4 or 5 carbon atoms.

In the above Formula (1), $R_2$ may be a branched or linear alkyl group, or a branched alkyl group, among (a) hydrogen, (b) a branched, cyclic, or linear alkyl group, and (c) an aryl group. In the above Formula (1), $R_2$ may be a branched alkyl group having 1 to 8 carbon atoms, or a branched alkyl group having 8 carbon atoms.

The polymerization initiator (X) may have a ten-hour half-life temperature of not lower than 90° C. and not higher than 100° C. With the above arrangement, in a case where the polymerization initiator (X) is added to the aqueous suspension before the first polymerization step in order to use the polymerization initiator (X) mainly in the second polymerization step, the polymerization initiator (X) is not excessively decomposed in the first polymerization step and can be used in a sufficient amount in the second polymerization step. For example, t-butylperoxy-2-ethylhexyl monocarbonate has a ten-hour half-life temperature of 99° C., and t-amylperoxy-2-ethylhexyl monocarbonate has a ten-hour half-life temperature of 98.5° C.

The polymerization initiator (X) may be used in an amount of not less than 0.25 parts by weight and not more than 0.90 parts by weight, or not less than 0.28 parts by weight and not more than 0.60 parts by weight, relative to 100 parts by weight of the monomers. In a case where the polymerization initiator (X) is used in an amount of less than 0.25 parts by weight relative to 100 parts by weight of the monomers, it is not possible to reduce a VOC content (particularly, styrene content) in the obtained expandable resin particles. In a case where the polymerization initiator (X) is (b) used in an amount of more than 0.90 parts by weight relative to 100 parts by weight of the monomers, it is difficult to adjust a weight average molecular weight of the copolymer during a polymerization reaction.

In terms of appropriately controlling a polymerization reaction, it is preferable to use, as the polymerization initiator, a combination of the polymerization initiator (X) and a polymerization initiator other than the polymerization initiator (X) in the copolymerization step. In the copolymerization step, it is more preferable to mainly use a polymerization initiator other than the polymerization initiator (X) in the first polymerization step and mainly use the polymerization initiator (X) in the second polymerization step.

The polymerization initiator (containing the polymerization initiator (X) and a polymerization initiator other than the polymerization initiator (X)) can be further added to the aqueous suspension as appropriate at any point in time during the copolymerization step. The following considers a case (case A) in which, as the polymerization initiator, (i) a polymerization initiator other than the polymerization initiator (X) is mainly used in the first polymerization step, and (ii) the polymerization initiator (X) is mainly used in the second polymerization step. In the case A, the polymerization initiator is added in accordance with one of the following two aspects: an aspect (aspect x) in which both the polymerization initiator (X) and a polymerization initiator other than the polymerization initiator (X) are added to the aqueous suspension prior to the first polymerization step;

and an aspect (aspect y) in which a polymerization initiator other than the polymerization initiator (X) is added to the aqueous suspension prior to the first polymerization step, and the polymerization initiator (X) is added to the aqueous suspension after the first polymerization step and prior to the second polymerization step. In terms of productivity, the aspect x is preferable.

The following explains the term "mainly used". For example, "the polymerization initiator other than the polymerization initiator (X) is mainly used in the first polymerization step" is intended to mean that more than 50% by weight of the polymerization initiator (100% by weight) used in the first polymerization step is the polymerization initiator other than the polymerization initiator (X), and is not intended to specify an amount of the polymerization initiator present in the first polymerization step. That is, it is intended that (i) the polymerization initiator (X) and the polymerization initiator other than the polymerization initiator (X) may coexist in the first polymerization step and (ii) more than 50% by weight of the polymerization initiator (100% by weight) that is used in the first polymerization step out of a mixture of the polymerization initiator (X) and the polymerization initiator other than the polymerization initiator (X) is the polymerization initiator other than the polymerization initiator (X). The terms "use/used" can be reworded as "utilize/utilized".

In the aspect x of the above case A, it is preferable that (a) the polymerization initiator (X) be added in a large amount to the aqueous suspension in view of that the polymerization initiator (X) is decomposed in the first polymerization step or (b) the polymerization initiator (X) be a polymerization initiator that is not easily decomposed in the first polymerization step. The polymerization initiator that is not easily decomposed in the first polymerization step is, for example, a polymerization initiator that is not easily decomposed at a polymerization temperature in the first polymerization step, and examples of such a polymerization initiator include a polymerization initiator having a ten-hour half-life temperature higher than the polymerization temperature in the first polymerization step.

(3-2. First Polymerization Step)

The first polymerization step is not particularly limited in terms of polymerization temperature, length of polymerization time, and the like, as long as the first polymerization step differs from the second polymerization step in polymerization temperature. The polymerization temperature in the first polymerization step is, for example, 85° C. to 95° C., and the length of the polymerization time in the first polymerization step is, for example, 4 hours to 7 hours.

In the first polymerization step, it is preferable to use a polymerization initiator other than the polymerization initiator (X) which polymerization initiator has a ten-hour half-life temperature of not lower than 74° C. and not higher than 94° C.

In the first polymerization step, the polymerization reaction may be carried out (a) with use of a polymerization initiator having a ten-hour half-life temperature of not lower than 74° C. and not higher than 94° C. and (b) at a polymerization temperature of not lower than 85° C. and not higher than 95° C. The above arrangement allows appropriately controlling the polymerization reaction. It is more preferable to use a bifunctional polymerization initiator in the first polymerization step in terms of easily adjusting a weight average molecular weight of the obtained copolymer and a reaction speed of the polymerization reaction. It is particularly preferable to use di-t-butylperoxy hexahydroterephthalate (ten-hour half-life temperature: 83° C.) in the first polymerization step as a polymerization initiator.

The first polymerization step may be carried out with use of a polymerization initiator other than the polymerization initiator (X) in an amount of not less than 0.1 parts by weight and not more than 1.0 parts by weight, or not less than 0.2 parts by weight and not more than 0.5 parts by weight, relative to 100 parts by weight of the monomers. In the first polymerization step, in a case where the polymerization initiator other than the polymerization initiator (X) is used in an amount of not less than 0.1 parts by weight relative to 100 parts by weight of the monomers, a sufficient progress of the polymerization is achieved. In a case where the polymerization initiator other than the polymerization initiator (X) is used in an amount of not more than 1.0 parts by weight relative to 100 parts by weight of the monomers, the polymerization reaction does not rapidly progress, and the polymerization is therefore easily controlled.

In the present production method, a weight average molecular weight of the copolymer can be adjusted by varying a combination of polymerization initiators, chain transfer agents, and polymerization conditions of the first polymerization step.

(3-3. Second Polymerization Step)

The second polymerization step is carried out successively to the first polymerization at any point in time after a polymerization conversion rate reaches 85%. It can be also said that the second polymerization step is carried out at any point in time after the polymerization conversion rate becomes equal to or higher than 85%. It can be also said that the second polymerization step is started at any point in time after the polymerization conversion rate reaches 85% (or becomes equal to or higher than 85%).

Unlike the polymerization temperature in the first polymerization step, the polymerization temperature in the second polymerization step is 110° C. to 120° C. In a case where the polymerization temperature in the second polymerization step is lower than 110° C., it is not possible to reduce a VOC content (particularly, styrene content) in the obtained expandable resin particles. In a case where the polymerization temperature in the second polymerization step is higher than 120° C., a polymerization device used in the copolymerization step has an increased internal pressure, and is required to have a high level of pressure resistance, accordingly. This results in a need for a heavily-equipped polymerization device. The polymerization temperature in the second polymerization step may be higher than the polymerization temperature in the first polymerization step. The above arrangement allows reducing a VOC content in the obtained expandable resin particles.

A length of the polymerization time in the second polymerization step is 3 hours to 8 hours. In a case where the length of the polymerization time in the second polymerization step is less than 3 hours, it is not possible to reduce a VOC content (particularly, styrene content) in the obtained expandable resin particles. In a case where the length of the polymerization time in the second polymerization step is more than 8 hours, an increased amount of the auxiliary flame retarder (e.g., dicumyl peroxide) is decomposed, which, when the foamed molded product is burned, prevents an effect of the auxiliary flame retarder from sufficiently exhibited and thus tends to cause a deterioration in flame retardancy.

The length of the polymerization time in the second polymerization step may be longer than 8 hours. For example, the length of the polymerization time in the second polymerization step may be 3 hours to 15 hours, 5 hours to 15 hours, 6 hours to 13 hours, 7 hours to 11 hours, or 8 hours to 9 hours. Expandable resin particles produced by a production method in which the length of polymerization time in the second polymerization step is within the above-described range is also one or more embodiments of the present invention.

In the second polymerization step, it is preferable to use a polymerization initiator having a ten-hour half-life temperature of not lower than 90° C. and not higher than 100° C., and it is more preferable to use mainly the polymerization initiator (X) having a ten-hour half-life temperature of not lower than 90° C. and not higher than 100° C. In the second polymerization step, the polymerization initiator (X) may be used in an amount of not less than 0.25 parts by weight and not more than 0.90 parts by weight, or not less than 0.28 parts by weight and not more than 0.60 parts by weight, relative to 100 parts by weight of the monomers. With the above arrangement, it is possible to reduce a VOC content (particularly, styrene content) in the obtained expandable resin particles. In the second polymerization step, it is possible to use, as a polymerization initiator other than the polymerization initiator (X), a polymerization initiator having a ten-hour half-life temperature of not lower than 90° C. and not higher than 100° C. and use, as the polymerization initiator (X) and in combination with the polymerization initiator other than the polymerization initiator (X), a polymerization initiator having a ten-hour half-life temperature of not lower than 90° C. and not higher than 100° C.

The second polymerization step may be carried out also as an expanding agent impregnation step which will be described later. That is, the second polymerization step may be carried out in the presence of an expanding agent.

In the second polymerization step, a ratio (weight average molecular weight (B)/weight average molecular weight (A)) of a weight average molecular weight (B) of the copolymer at an end of the second polymerization step to a weight average molecular weight (A) of the copolymer at a start of the second polymerization step may range from 1 to 1.5. The inventors of one or more embodiments of the present invention found the following points for the first time: (a) for general expandable resin particles (e.g., expandable polystyrene resin particles), use of the polymerization initiator (X) as a polymerization initiator significantly reduces a weight average molecular weight of a styrene polymer in a step equivalent to the second polymerization step of the present production method; and (b) in the second polymerization step of the present production method, a weight average molecular weight of the copolymer is not reduced, and the (weight average molecular weight (B)/weight average molecular weight (A)) ratio ranges from 1 to 1.5 as described above. Therefore, expandable resin particles obtained by the present production method, in contrast to the general expandable resin particles, allow providing a foamed molded product that is adequate in heat resistance, strength, and flame retardancy. A weight average molecular weight of the copolymer can be measured by a measuring method similar to the method of measuring a weight average molecular weight of the base material resin described in the section [2. Expandable resin particles]. A concrete method will be described later with reference to Examples.

The copolymerization step may be carried out such that (a) the chain transfer agent is used in an amount of not less than 0.4 parts by weight relative to 100 parts by weight of the monomers, (b) the first polymerization step is carried out with use of a bifunctional polymerization initiator as a polymerization initiator other than the polymerization initiator (X) and at a polymerization temperature of not lower than 85° C. and not higher than 94° C., and (c) then the second polymerization step is carried out (i) with use of a polymerization initiator having a ten-hour half-life temperature of not lower than 90° C. and not higher than 100° C. as the polymerization initiator (X) in an amount of not less than 0.25 parts by weight and not more than 0.9 parts by weight and (ii) at a polymerization temperature of not lower than 110° C. and not higher than 120° C.

In the second polymerization step, it is preferable that (i) the polymerization initiator (X) be used as the polymerization initiator and (ii) the length of the second polymerization step be 3 hours to 15 hours. The inventors of one or more embodiments of the present invention found for the first time that a base material resin in expandable resin particles produced by a production method having the above arrangement has a TH/TQ ratio of less than 1.20. The reason for this is uncertain but can be predicted to be as follows. During a polymerization reaction, the polymerization initiator (X) is decomposed into two compounds, one of which has $R_1$ and the other has $R_2$. In each of the compound having $R_1$ and the compound having $R_2$, a radical is generated at a decomposition point (one terminal) of the compound. Note here that depending on the number of carbon atoms of $R_1$ and whether or not $R_1$ has a branched structure, the compound having $R_1$ may undergo a situation where the compound having $R_1$ is further decomposed through beta elimination so that alkyl radicals such as an ethyl radical and a propyl radical are generated, rather than a situation where a radical is generated at a decomposition point (one terminal) of the compound. These radicals cause the polymerization reaction to progress. Each of the compound having $R_1$ and the compound having $R_2$ that are produced from the polymerization initiator (X) has a radical only at one terminal of the compound. As such, in a polymerization reaction by the polymerization initiator (X), a reaction product (an obtained polymer) does not have a high molecular weight as easily as in a polymerization reaction by a polymerization initiator (e.g., the polymerization initiator described in Patent Literature 1 above) other than the polymerization initiator (X). Further, the radical species generated in the compound having $R_2$ is highly reactive, and therefore in the second polymerization step, the polymerization initiator (X) abstracts hydrogen in the reaction product (the obtained polymer) and prompts decomposition of the reaction product (the obtained polymer). This presumably makes it difficult to produce a high molecular weight reaction product (i.e., base material resin). For other aspects of the TH/TQ ratio of the base material resin, reference is made as appropriate to the descriptions in the item (TH/TQ ratio of base material resin) in the section (2-5. Physical properties).

(3-5. Expanding Agent Impregnation Step)

The expanding agent impregnation step may be carried out at any point in time. For example, the expanding agent impregnation step may be carried out together with the second polymerization step or after the second polymerization step.

In the expanding agent impregnation step, an expandable resin particle body can be obtained by impregnating the copolymer, which is obtained in the copolymerization step, with an expanding agent.

The expanding agent impregnation step is initiated by adding the expanding agent into the aqueous suspension, and not limited to any particular treatment temperature (also referred to as "impregnation temperature") and any particular length of treatment time (also referred to as "impregnation time").

A strength of a binding force between polymer chains in the base material resin contained in the expandable resin particles is in inverse proportion to an efficiency of impregnation of the copolymer with the expanding agent in the production of the expandable resin particles. The present production method can provide expandable resin particles that contain a base material resin having a strong binding force between polymer chains. Accordingly, in terms of sufficiently impregnating the copolymer with the expanding agent, the expanding agent impregnation step in the present production method may have an impregnation temperature of 110° C. to 120° C. and an impregnation time of 3 hours to 8 hours.

(3-6. Drying Step)

The present production method may further include a drying step of carrying out a drying treatment with respect to the expandable resin particles. The expandable resin particles are obtained dispersed in the aqueous suspension. As such, in a case where the present production method includes the drying step, the obtained expandable resin particles can be suitably used for production of expanded particles and the like.

In the drying step, the method of carrying out a drying treatment with respect to the expandable resin particles is not particularly limited, and, for example, an agitated trough or cylindrical dryer, a box-type or band-type through-flow dryer, a fluidized-bed dryer, or the like can be used.

The drying treatment in the drying step may be carried out at or below an expansion temperature of the expandable resin particles, or, in terms of productivity, carried out at 30° C. to 55° C. Adjusting the temperature (also referred to as "treatment temperature") at which the drying treatment is carried out allows adjusting a water content of the obtained expandable resin particles. In a case where the temperature at which the drying treatment in the drying step is carried out is not lower than 30° C., the water content is not too high, so that expanded particles that can be provided with use of the expandable resin particles do not have fine cells. In a case where the temperature at which the drying treatment in the drying step is carried out is not higher than 55° C., the water content is not too low, so that a foamed molded product that can be provided with use of the expandable resin particles do not have a deteriorated flame retardancy.

The method of producing expandable resin particles in accordance with one or more embodiments of the present invention can have the following aspect: a method of producing expandable resin particles, including: a copolymerization step of copolymerizing monomers so as to obtain a copolymer, the monomers including a styrene monomer and an acrylonitrile monomer; and an expanding agent impregnation step of impregnating the copolymer with an expanding agent, in the copolymerization step, a polymerization initiator containing a polymerization initiator (X) having a structure represented by the Formula (1) above being used, the polymerization initiator (X) being used in an amount of not less than 0.25 parts by weight and not more than 0.90 parts by weight relative to 100 parts by weight of the monomers, the copolymerization step including a first polymerization step and a second polymerization step which are successive steps and differ from each other in polymerization temperature, the second polymerization step being carried out at any point in time after a polymerization conversion rate reaches 85%, a polymerization temperature in the second polymerization step being 110° C. to 120° C., a length of polymerization time in the second polymerization step being 3 hours to 8 hours, wherein $R_1$ and $R_2$ are each independently hydrogen, a branched, cyclic, or linear alkyl group having 1 to 12 carbon atoms, or an aryl group having 6 to 12 carbon atoms, and may be identical to or different from each other.

[4. Expanded Particles and Foamed Molded Product]

The expandable resin particles can be made into expanded particles by a general expansion method. Specific examples of the expansion method include a method in which (1) to (3) are sequentially carried out: (1) the expandable resin particles are placed in a container provided with a stirrer, and (2) the expandable resin particles are heated with use of a heat source such as steam, so that (3) the expandable resin particles are expanded until a desired expansion ratio is achieved, so as to obtain expanded particles. Note that the expanded particles may be also referred to as "pre-expanded particles", and an expansion method for obtaining pre-expanded particles may be also referred to as "pre-expansion method", accordingly.

The device used for expansion of the expandable resin particles and the expansion conditions under which the expansion is carried out are not particularly limited, and can be set as appropriate in accordance with a composition of the expandable resin particle body, a desired expansion ratio, and the like.

The expanded particles can be molded into a foamed molded product by a general in-mold molding method. Specific examples of the in-mold molding method include a method in which the expanded particles with which a mold that can be closed but cannot be sealed is filled are fused together by heating with use of steam, so that the expanded particles are molded into a foamed molded product.

The device used for the in-mold expansion molding and the conditions under which the in-mold expansion molding is carried out are not particularly limited, and can be set as appropriate in accordance with a composition of the expandable resin particle body, a desired expansion ratio, and the like.

From a foamed molded product in accordance with one or more embodiments of the present invention, styrene is released in an amount of not more than 1.5 μg and ethylbenzene is released in an amount of not more than 3.0 μg. Note that each of the amount of the styrene released from the foamed molded product and the amount of the ethylbenzene released from the foamed molded product is an amount released in a case where the foamed molded product in a size of 100 mm in height×100 mm in width×15 mm in thickness is left under a condition of 60° C. for 2 hours. The amount of the styrene released from the foamed molded product in accordance with one or more embodiments of the present invention may be not more than 1.3 μg, not more than 1.0 μg, not more than 0.7 μg, or not more than 0.5 μg. The amount of the ethylbenzene released from the foamed molded product in accordance with one or more embodiments of the present invention may be not more than 2.7 μg, not more than 2.5 μg, not more than 2.3 μg, or not more than 2.0 μg. An amount of total VOC released from the foamed molded product in accordance with one or more embodiments of the present invention may be not more than 5.0 μg, not more than 4.5 μg, not more than 4.0 μg, or more than 3.0 μg. In a case where the amounts of the styrene, the ethylbenzene, and the total VOC released from the foamed molded product in accordance with one or more embodiments of the present invention are within the above-described respective ranges, the foamed molded product is advantageously unlikely to have a negative effect, such as sick house syndrome, on a human body when used as an automobile interior material or an insulating material for use as a building material. Amounts (i.e., an amount of VOC released or an amount of total VOC released) of styrene, ethylbenzene, acrylonitrile, and alpha-methylstyrene released from the foamed molded product can be measured by a measuring method similar to that of a VOC content in the expandable resin particles. A concrete method will be described later with reference to Examples.

In the present specification, "a foamed molded product in accordance with one or more embodiments of the present invention" may be simply referred to as "the present foamed molded product". In other words, the term "the present foamed molded product" is intended to mean one or more embodiments of a foamed molded product in the present invention.

The present foamed molded product may be a foamed molded product which is produced with use of expanded particles which have been produced with use of (i) the expandable resin particles described in the section [2. Expandable resin particles] or (ii) expandable resin particles produced with use of the production method described in the section [3. Method of producing expandable resin particles].

The present foamed molded product may have an oxygen index of not less than 26%, not less than 27%, not less than 28%, or not less than 29%. With the above arrangement, the foamed molded product advantageously exhibits a sufficient flame retardancy when used as an automobile interior material or an insulating material for use as a building material.

The present foamed molded product may be excellent in heat resistance. For example, in a case where the present foamed molded product is used as a heat insulating material or as a material of a member of an automobile which member is exposed to sunlight, an extent to which the present foamed molded product is deformed when used at a temperature of not lower than 90° C. may be small. Specifically, in a case where the foamed molded product has an expansion ratio of 40 times and is left under a condition of 90° C. for 168 hours, a rate of dimensional change of the foamed molded product which change is observed before and after being left may be not more than 0.4%, not more than 0.35%, not more than 0.3%, and not less than 0.25%.

The present foamed molded product may have an average cell diameter of 50 μm to 150 μm, 50 μm to 100 μm, 60 μm to 100 μm, or 60 μm to 90 μm. In a case where the average cell diameter is not less than 50 μm, the following results (a) to (c) are obtained. (a) A cell membrane has a sufficient thickness, so that the foamed molded product undergoes a dimensional change in response to temperature to a smaller extent. (b) An amount of VOC released and an amount of total VOC released from the foamed molded product can be reduced. (c) The sufficient thickness of the cell membrane prevents the cell membrane from being melted by pressurized steam during in-mold molding, so that the foamed molded product has a good surface property. In a case where the cell membrane is thin, the foamed molded product may expand in an environment of not lower than 90° C., so as to have a poor dimensional stability. Expansion of the foamed molded product in a high temperature environment may be also referred to as "third-step expansion". In a case where the average cell diameter is not more than 150 μm, the foamed molded product has a good surface property.

The present foamed molded product may have uniform cells. Specifically, in a case where (i) the foamed molded product is cut and (ii) the total number of expanded particles on a cut surface is defined to be 100%, a ratio of expanded particles having a double cell on the cut surface may be not more than 20%, not more than 15%, not more than 10%, or not more than 5%. Note here that an expanded particle having a double cell is intended to mean "an expanded particle that has a layer having a large cell (50 μm to 150 μm) and a layer having a small cell (10 μm)". The "expanded particle having a double cell" is also referred to as an "expanded particle having uneven cells". With the above arrangement, the cell membrane has a sufficient thickness, so that (a) the foamed molded product is excellent in heat resistance, (b) an amount of VOC released and an amount of total VOC released from the foamed molded product can be reduced, and (c) the foamed molded product has a good surface property.

One or more embodiments of the present invention may be arranged as follows.

[1] Expandable resin particles, containing: a base material resin containing, as a structural unit, a styrene unit and an acrylonitrile unit; and an expanding agent, the expandable resin particles having a styrene content of not more than 20 ppm and an ethylbenzene content of not more than 130 ppm.

[2] The expandable resin particles as set forth in [1], wherein: (a) the base material resin further contains an alpha-methylstyrene unit as a structural unit; (b) an amount of the styrene unit in the base material resin is not less than 60 parts by weight and not more than 75 parts by weight, an amount of the acrylonitrile unit in the base material resin is not less than 21 parts by weight and not more than 27 parts by weight, and an amount of the alpha-methylstyrene unit in the base material resin is not less than 3 parts by weight and not more than 15 parts by weight; and (c) a total amount of the styrene unit, the acrylonitrile unit, and the alpha-methylstyrene unit in the base material resin is 100 parts by weight.

[3] The expandable resin particles as set forth in [1] or [2], having a water content of not less than 1%.

[4] The expandable resin particles as set forth in any one of [1] through [3], wherein the base material resin has a TH/TQ ratio of less than 1.20.

[5] A foamed molded product, from which styrene is released in an amount of not more than 1.5 μg and ethylbenzene is released in an amount of not more than 3.0 μg, wherein each of the amount of the styrene released from the foamed molded product and the amount of the ethylbenzene released from the foamed molded product is an amount released in a case where the foamed molded product in a size of 100 mm in height×100 mm in width×15 mm in thickness is left under a condition of 60° C. for 2 hours.

[6] A method of producing expandable resin particles, including: a copolymerization step of copolymerizing monomers so as to obtain a copolymer, the monomers including a styrene monomer and an acrylonitrile monomer; and an expanding agent impregnation step of impregnating the copolymer with an expanding agent, in the copolymerization step, a polymerization initiator containing a polymerization initiator (X) having a structure represented by the Formula (1) below being used, the polymerization initiator (X) being used in an amount of not less than 0.25 parts by weight and not more than 0.90 parts by weight relative to 100 parts by weight of the monomers, the copolymerization step including a first polymerization step and a second polymerization step which are successive steps and differ from each other in polymerization temperature, the second polymerization step being carried out at any point in time after a polymerization conversion rate reaches 85%, a polymerization temperature in the second polymerization step being 110° C. to 120° C., a length of polymerization time in the second polymerization step being 3 hours to 8 hours,

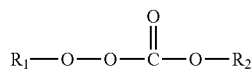

Formula (1)

wherein $R_1$ and $R_2$ are each independently hydrogen, a branched, cyclic, or linear alkyl group having 1 to 12 carbon atoms, or an aryl group having 6 to 12 carbon atoms, and may be identical to or different from each other.

[7] The method as set forth in [6], wherein: in the copolymerization step, (a) the styrene monomer, the acrylonitrile monomer, and an alpha-methylstyrene monomer are copolymerized; (b) an amount of the styrene monomer added is not less than 60 parts by weight and not more than 75 parts by weight, an amount of the acrylonitrile monomer added is not less than 21 parts by weight and not more than 27 parts by weight, and an amount of the alpha-methylstyrene monomer added is not less than 3 parts by weight and not more than 15 parts by weight; and (c) a total amount of the styrene monomer, the acrylonitrile monomer, and the alpha-methylstyrene monomer added is 100 parts by weight.

[8] The method as set forth in [6] or [7], wherein in the second polymerization step, a ratio (weight average molecular weight (B)/weight average molecular weight (A)) of a weight average molecular weight (B) of the copolymer at an end of the second polymerization step to a weight average molecular weight (A) of the copolymer at a start of the second polymerization step ranges from 1 to 1.5.

[9] The method as set forth in any one of [6] through [8], further including a drying step of carrying out a drying treatment with respect to the expandable resin particles, the drying treatment being carried out at 30° C. to 55° C.

EXAMPLES

The following will describe Examples and Comparative Examples, but one or more embodiments of the present invention are not limited by these Examples and Comparative Examples.

The following polymerization initiators, chain transfer agents, flame retarders, and auxiliary flame retarders were used in the Examples and the Comparative Examples.

Polymerization Initiator (X):
t-butylperoxy-2-ethylhexyl monocarbonate (PERBUTYL E, manufactured by NOF CORPORATION) (ten-hour half-life temperature: 99° C.) (which has a structure represented by Formula (1), where $R_1$ is a branched alkyl group having 4 carbon atoms and no functional group, and $R_2$ is a branched alkyl group having 8 carbon atoms and no functional group); and
t-amylperoxy-2-ethylhexyl monocarbonate (Trigonox131, manufactured by KAYAKU AKZO CO., LTD.) (ten-hour half-life temperature: 98.5° C.) (which has a structure represented by Formula (1), where $R_1$ is a linear alkyl group having 5 carbon atoms and no functional group, and $R_2$ is a linear alkyl group having 8 carbon atoms and no functional group).

Polymerization Initiator Other than the Polymerization Initiator (X):
benzoyl peroxide (NYPER BW, manufactured by NOF CORPORATION) (ten-hour half-life temperature: 74° C.); di-t-butylperoxy hexahydroterephthalate (Kaya Ester HTP-65W, manufactured by KAYAKU AKZO CO., LTD.) (ten-hour half-life temperature: 83° C.);
1,1-bis(t-butylperoxy)cyclohexane (PERHEXA C, manufactured by NOF CORPORATION) (ten-hour half-life temperature: 90° C.); and
1,1-bis(t-amylperoxy)-3,3,5-trimethylcyclohexane (manufactured by Arkema S.A) (ten-hour half-life temperature: 86° C.).

Flame Retarder:
tetrabromobisphenol A-bis(2,3-dibromo-2-methylpropyl) ether (Pyro-Guard SR-130, manufactured by Dai-ichi Kogyo Seiyaku Co., Ltd.).

Auxiliary Flame Retarder:
dicumyl peroxide (PERCUMYL D, manufactured by NOF CORPORATION).

Chain Transfer Agent:
α-methylstyrene dimer (MSD, manufactured by NOF CORPORATION).

In the Examples and the Comparative Examples, (a) a weight average molecular weight and a TH/TQ ratio of a copolymer (base material resin) and (b) a VOC content, a total VOC content, and a water content in expandable resin particles were measured and evaluated by the following method. Note that "parts" and "percentages" indicate parts by weight and percentages by weight, respectively, unless otherwise noted.

(Method of Measuring Weight Average Molecular Weights (A) and (B))

0.02 g of a product in an autoclave at a start of a second polymerization step or 0.02 g of a product in the autoclave at an end of the second polymerization step was dissolved in 20 ml of tetrahydrofuran, and a resultant solution was subjected to measurement with use of gel permeation chromatography (HLC-8020, manufactured by Tosoh Corporation, column: TSKgel Super HZM-H, column temperature: 40° C., flow rate: 0.35 ml/1 min).

From a result obtained using the product in the autoclave at the start of the second polymerization step, an average molecular weight (A) of a copolymer at the start of the second polymerization step is obtained. From a result obtained using the product in the autoclave at the end of the second polymerization step, an average molecular weight (B) of the copolymer at the end of the second polymerization step is obtained. Note that the product in the autoclave at the start of the second polymerization step and the product in the autoclave at the end of the second polymerization step may contain, as well as the copolymer, a substance (an additive or the like) added to an aqueous suspension during a copolymerization step, an expanding agent, and/or the like. Carrying out gel permeation chromatography with use of the product allows calculating a weight average molecular weight of the copolymer, since a peak derived from the copolymer is distinguishable from a peak derived from the additive and from a peak derived from the expanding agent. The weight average molecular weight was calculated in terms of a molecular weight of a standard polystyrene.

(Method of Calculating TH/TQ Ratio of Base Material Resin)

0.02 g of the resultant expandable resin particles were dissolved in 20 ml of tetrahydrofuran (THF) to obtain a sample. The obtained sample was then subjected to GPC measurement with use of gel permeation chromatography under the following conditions to obtain a GPC measurement chart.

Measuring device: high-speed GPC device HLC-8220 manufactured by TOSOH CORPORATION
Used column: SuperHZM-H×2, SuperH-RC×2 manufactured by TOSOH CORPORATION (4 columns in total)
Column temperature: 40° C.

Mobile phase: THF (tetrahydrofuran)
Flow rate: 0.35 ml/minute
Injection volume: 10 μl
Detector: RI With respect to a GPC curve of the obtained GPC measurement chart, a TH/TQ ratio was calculated by the above-described method. The TH/TQ ratio of the expandable resin particles thus obtained was taken as a TH/TQ ratio of a base material resin. The obtained results are shown in Tables 3 and 4 as TH/TQ ratios.

(Methods of Measuring and Evaluating VOC Content and Total VOC Content in Expandable Resin Particles)

0.25 g of the expandable resin particles was dissolved in 20 ml of methylene chloride together with an internal standard cyclopentanol. Styrene, ethylbenzene, acrylonitrile, and alpha-methylstyrene contained in the expandable resin particles were measured using gas chromatography (GC-2014, manufactured by Shimadzu Corporation). Conditions for the gas chromatography are as follows.

Capillary column: Rtx-1, manufactured by GL Sciences Inc.
Column temperature condition: heating from 50° C. to 80° C. at a heating rate of at 3° C./min, then heating from 80° C. to 180° C. at a heating rate of 10° C./min
Carrier gas: Helium With use of calibration curves of respective measured substances, contents of styrene, ethylbenzene, acrylonitrile, and alpha-methylstyrene in the expandable resin particles were calculated from the obtained results. Note that in a case where a content of a VOC and a content of total VOC that were not more than a measurement limit are indicated as "ND (an abbreviation of 'not detected')" in Table 5. Further, a VOC content in the expandable resin particles was evaluated by the following criteria:

G (Good): The styrene content is not more than 20 ppm, and the ethylbenzene content is not more than 130 ppm.
P (Poor): The styrene content is more than 20 ppm, and the ethylbenzene content is more than 130 ppm.

(Method of Measuring Water Content in Expandable Resin Particles)

0.04 g of the expandable resin particles was weighed, and a water content in the expandable resin particles was measured using AQ-2200AF (single-chamber electrolysis cell, manufactured by HIRANUMA SANGYO Co., Ltd., Karl Fischer solution: Aqualite RS-A (D327660-A02, manufactured by HIRANUMA SANGYO Co., Ltd.), methanol (optional)).

Methods of producing expanded particles and a foamed molded product are as follows.

(Method of Producing Expanded Particles)

The expandable resin particles were sieved, so that expandable resin particles having a particle size of 0.5 mm to 1.4 mm were separated. Then, the separated expandable resin particles were expanded, with use of a pressure pre-expanding machine "BHP manufactured by Obiraki Industry Co., Ltd." under a blowing vapor pressure of 0.08 MPa to 0.12 MPa, so that expanded particles with a volume magnification of 40 times were obtained. Thereafter, the expanded particles thus obtained were left under a normal temperature for one day, and then used for production of a foamed molded product.

(Method of Producing Foamed Molded Product)

The obtained expanded particles were molded in a mold with use of a molding machine "KR-57 manufactured by DAISEN Co., Ltd." under a blowing vapor pressure of 0.06 MPa, so that a plate-like foamed molded product having a thickness of 20 mm, a height of 400 mm, and a width of 350 mm was obtained.

The obtained foamed molded product was evaluated in terms of amount of VOC released, amount of total VOC released, surface property, average cell diameter, ratio of expanded particles having uneven cells, oxygen index, heat resistance, and the like by the following methods.

(Methods of Measuring and Evaluating Amounts of VOC and Total VOC which are Released from Foamed Molded Product)

A sample piece having a size of 100 mm in height×100 mm in width×15 mm in thickness was cut out from the foamed molded product. The sample piece was put in a tetra bag and left under a condition of 60° C. for 2 hours, during which styrene, ethylbenzene, acrylonitrile, and alpha-methylstyrene released from the sample piece were collected. In accordance with a method similar to the method of measuring a VOC content and a total VOC content in expandable resin particles, the substances thus collected were measured using gas chromatography. With use of calibration curves of the measured substances, amounts of styrene, ethylbenzene, acrylonitrile, and alpha-methylstyrene released from the foamed molded product were calculated from obtained results. An amount of a VOC released and an amount of total VOC released that were not more than a measurement limit are indicated as "ND (an abbreviation of 'not detected')" in Table 7. Further, an amount of VOC released from the foamed molded product was evaluated by the following criteria:

G (Good): The amount of styrene released is not more than 1.5 μg, and the amount of ethylbenzene released is not more than 3.0 μg.
P (Poor): The amount of styrene released is more than 1.5 μg, and the amount of ethylbenzene released is more than 3.0 μg.

(Method of Measuring Average Cell Diameter)

An average cord length per expanded particle of the foamed molded product was measured in accordance with ASTM-D-2842-97 such that (i) a straight line was drawn on a cut surface of the foamed molded product in a photograph of the cut surface of the foamed molded product, and (ii) an average cell diameter was measured on the basis of the number of cells through which the straight line passed. An average cord length of 10 expanded particles contained in the foamed molded product was taken as a final value. Note that also with respect to an expanded particle having a double cell, the measurement of the average cell diameter was conducted by a similar operation.

(Cell Uniformity Evaluation Method)

On the basis of the average cell diameter thus obtained, cell uniformity was evaluated by the following criteria.

G (Good): Among all expanded particles of the foamed molded product, a ratio of expanded particles having a uniform cell (average cell diameter) is not less than 80%.
P (Poor): Among all expanded particles of the foamed molded product, a ratio of expanded particles having a uniform cell (average cell diameter) is less than 80%.

Note that "expanded particles having a uniform cell (average cell diameter)" is intended to mean expanded particles each of which does not have a double cell. The double cell will be described in detail later.

(Method of Evaluating Surface Property of Foamed Molded Product)

A state of a surface of the foamed molded product was evaluated using the following criteria, by visual observation of gaps between expanded particles on the surface. A greater numerical value refers to a beautiful surface state in which the surface of the foamed molded product had fewer or no gaps between expanded particles. Not less than 3 points out of 5 was rated as "G (Good)", and not more than 2 points out of 5 was rated as "P (Poor)".

5: No gap between particles was found in the surface.
4: The surface partially had gaps between particles, but the gaps were hardly noticeable.
3: The surface had, here and there, gaps between particles, but the gaps were permissible as a whole.
2: Gaps between particles were noticeable.
1: The surface had many gaps between particles.

(Method of Measuring Ratio of Expanded Particles Having Uneven Cells)

The foamed molded product was cut into a size of 8 cm in height×8 cm in width×0.1 cm in thickness. The number (A) of expanded particles having a double cell (expanded particles each of which has a layer having a large cell (50 μm to 150 μm) and a layer having a small cell (10 μm)) on a cut surface of 8 cm in height×8 cm in width was counted. A total number (B) of expanded particles on the cut surface was counted. With use of the following equation, a ratio (C) of the expanded particles having a double cell on the cut surface was calculated as a ratio of expanded particles having uneven cells.

$$C \text{ (ratio of expanded particles having uneven cells)} (\%)=(A)/(B)\times 100$$

In a case where the ratio of expanded particles having uneven cells was not more than 20%, the ratio was judged to be passed.

(Method of Measuring Oxygen Index)

A foamed molded product having an expansion ratio of 40 times was dried at 60° C. for 12 hours. Then, a sample piece having a size of 10 mm in height×10 mm in width×200 mm in thickness was cut out from the foamed molded product. An oxygen index of the sample piece was measured in accordance with JIS K7201 (a method of testing flammability with use of an oxygen index). An oxygen index of not less than 26 was judged to be passed.

(Heat Resistance Evaluation Method and Method of Evaluating Expansion of Foamed Molded Product at the Time of Heat Resistance Evaluation)

Heat resistance of a foamed molded product was evaluated as follows by (a) calculating a rate of dimensional change of the foamed molded product at 90° C. and (b) observing expansion of the surface of foamed molded product. A foamed molded product having an expansion ratio of 40 times was dried at 60° C. for 24 hours. Then, a sample piece having a size of 150 mm in height×150 mm in width×20 mm in thickness was cut out from the foamed molded product. A length of the sample piece in a height direction and a length of the sample piece in a width direction were measured, each at three portions of the sample piece, and used as initial dimensions (D). Subsequently, the foamed molded product was left in a dryer at 90° C. for 168 hours. Then, similar measurement was carried out, and measured lengths were used as post-drying dimensions (E). A rate of dimensional change was calculated by the following equation. A rate of dimensional change having an absolute value of not more than 0.4, i.e., a rate of dimensional change of −0.4% to 0.4% was judged to be passed. Note that a rate of dimensional change having a positive value indicates that the post-drying dimensions (E) were greater than the initial dimensions (D), i.e., that the foamed molded product expanded. Note that a rate of dimensional change having a negative value indicates that the post-drying dimensions (E) were smaller than the initial dimensions (D), i.e., that the foamed molded product contracted.

$$\text{Rate of dimensional change (\%)}=(\text{post-drying dimensions } (E)-\text{initial dimensions } (D))/(D)\times 100$$

Further, expansion of the surface of the foamed molded product observed before and after the foamed molded product was left in the dryer at 90° C. was evaluated as follows based on the above rate of dimensional change. In a case where the rate of dimensional change had a negative value, it was determined that the surface had not expanded, and thus the rating of "G (Good)" was given. In a case where the rate of dimensional change had a positive value, it was determined that the surface had expanded, and the rating of "P (Poor)" was given.

Examples 1 to 7 and Comparative Examples 1 to 8

Into a 6 L autoclave provided with a stirrer, 110 parts by weight of water, 0.105 parts by weight of tricalcium phosphate (dispersing agent), and 0.0075 parts by weight of α-olefin sodium sulfonate (surfactant) were fed together with a polymerization initiator, a chain transfer agent, a flame retarder, and an auxiliary flame retarder in respective amounts written in Tables 1 and 2. The autoclave was deaerated with use of a vacuum pump until a gage pressure of 0.06 MPa was achieved.

Then, the raw materials thus fed were started to be stirred with use of a stirrer. While the raw materials were stirred, a styrene monomer, an alpha-methylstyrene monomer, and an acrylonitrile monomer in respective amounts written in Tables 1 and 2 were further fed into the autoclave. Then, the raw materials thus fed were stirred for 30 minutes. Subsequently, a first polymerization step was carried out by elevating a temperature inside the autoclave to 90° C., and maintaining the temperature inside the autoclave at 90° C. for 5 hours 00 minutes. Then, 5 parts by weight of normal rich butane (parts by weight of normal butane/parts by weight of isobutane=70/30) was fed into the autoclave. Subsequently, an expanding agent impregnation step was carried out together with the second polymerization step, at a temperature and for a time indicated in Tables 3 and 4 (That is, a polymerization temperature and a length of polymerization time in the second polymerization step which are indicated in Tables 3 and 4 are an impregnation temperature and a length of impregnation time in the expanding agent impregnation step.). Then, the temperature inside the autoclave was reduced to 40° C., and a resultant product was dehydrated. Further, a drying step was carried out at 40° C. to obtain expandable resin particles. The expandable resin particles were subjected to the above-described various types of measurement and evaluation, results of which are shown in Tables 5 and 6.

TABLE 1

| | | | | Ex. 1 | Ex. 2 | Ex. 3 | Ex. 4 | Ex. 5 | Ex. 6 | Ex. 7 |
|---|---|---|---|---|---|---|---|---|---|---|
| Added substance | Monomer | Styrene | pt. wt | 71 | 71 | 71 | 71 | 71 | 71 | 71 |
| | | Acrylonitrile | pt. wt | 24 | 24 | 24 | 24 | 24 | 24 | 24 |
| | | Alpha-methylstyrene | pt. wt | 5 | 5 | 5 | 5 | 5 | 5 | 5 |
| | | Amount (pt. wt) of ethylbenzene monomer added in amount of styrene monomer added | ×10⁻⁴ pt. wt | 70 | 70 | 70 | 70 | 130 | 70 | 70 |

TABLE 1-continued

|  |  |  |  | Ex. 1 | Ex. 2 | Ex. 3 | Ex. 4 | Ex. 5 | Ex. 6 | Ex. 7 |
|---|---|---|---|---|---|---|---|---|---|---|
| Polymerization initiator | Polymerization initiator other than polymerization initiator (x) | Benzoyl peroxide | pt. wt | 0 | 0 | 0 | 0 | 0 | 0 | 0 |
|  |  | Di-t-butylperoxy hexahydroterephthalate | pt. wt | 0.3 | 0.21 | 0.11 | 0.21 | 0.3 | 0.21 | 0.21 |
|  |  | 1,1-Bis(t-butylperoxy)cyclohexane | pt. wt | — | — | — | — | — | — | — |
|  |  | 1,1-Bis(t-amylperoxy)-3,3,5-trimethylcyclohexane | pt. wt | — | — | — | — | — | — | — |
|  | Polymerization initiator (x) | t-Butylperoxy-2-ethylhexyl monocarbonate | pt. wt | 0.29 | 0.58 | 0.87 | 0.58 | 0.29 | — | 0.58 |
|  |  | t-Amylperoxy-2-ethylhexyl monocarbonate | pt. wt | — | — | — | — | — | 0.58 | — |
| Flame retarder | Tetrabromobisphenol A-bis(2,3-dibromo-2-methylpropyl)ether |  | pt. wt | 2.0 | 2.0 | 2.0 | 2.0 | 2.0 | 2.0 | 2.0 |
| Auxiliary flame retarder | Dicumyl peroxide |  | pt. wt | 1.0 | 1.0 | 1.0 | 1.0 | 1.0 | 1.0 | 1.0 |
| Chain transfer agent | α-Methylstyrene dimer |  | pt. wt | 0.8 | 0.8 | 0.8 | 0.8 | 0.8 | 0.8 | 0.8 |

TABLE 2

|  |  |  |  | Compar. Ex. 1 | Compar. Ex. 2 | Compar. Ex. 3 | Compar. Ex. 4 | Compar. Ex. 5 | Compar. Ex. 6 | Compar. Ex. 7 | Compar. Ex. 8 |
|---|---|---|---|---|---|---|---|---|---|---|---|
| Added substance | Monomer | Styrene | pt. wt | 71 | 71 | 71 | 71 | 71 | 71 | 85 | 100 |
|  |  | Acrylonitrile | pt. wt | 24 | 24 | 24 | 24 | 24 | 24 | 10 | 0 |
|  |  | Alpha-methylstyrene | pt. wt | 5 | 5 | 5 | 5 | 5 | 5 | 5 | 0 |
|  |  | Amount (pt. wt) of ethylbenzene monomer added in amount of styrene monomer added | ×10$^{-4}$ pt. wt | 70 | 70 | 70 | 70 | 70 | 70 | 70 | 70 |
| Polymerization initiator | Polymerization initiator other than polymerization initiator (x) | Benzoyl peroxide | pt. wt | 0 | 0 | 0 | 0 | 0 | 0 | 0 | 0.2 |
|  |  | Di-t-butylperoxy hexahydroterephthalate | pt. wt | 0.3 | 0.3 | 0.3 | 0.15 | 0.3 | 0.21 | 0.21 | 0 |
|  |  | 1,1-Bis(t-butylperoxy)cyclohexane | pt. wt | 0.2 | — | 0.2 | 0.58 | — | — | — | — |
|  |  | 1,1-Bis(t-amylperoxy)-3,3,5-trimethyl-cyclohexane | pt. wt | — | 0.2 | — | — | — | — | — | — |
|  | Polymerization initiator (x) | t-Butylperoxy-2-ethylhexyl monocarbonate | pt. wt | — | — | — | — | 0.22 | 0.58 | 0.58 | 0.373 |
|  |  | t-Amylperoxy-2-ethylhexyl monocarbonate | pt. wt | — | — | — | — | — | — | — | — |
| Flame retarder | Tetrabromobisphenol A-bis(2,3-dibromo-2-methylpropyl)ether |  | pt. wt | 2.0 | 2.0 | 2.0 | 2.0 | 2.0 | 2.0 | 2.0 | 2.0 |
| Auxiliary flame retarder | Dicumyl peroxide |  | pt. wt | 1.0 | 1.0 | 1.0 | 1.0 | 1.0 | 1.0 | 1.0 | 1.0 |
| Chain transfer agent | α-Methylstyrene dimer |  | pt. wt | 0.8 | 0.8 | 0.8 | 0.8 | 0.8 | 0.8 | 0.2 | 0.8 |

TABLE 3

|  |  | Ex. 1 | Ex. 2 | Ex. 3 | Ex. 4 | Ex. 5 | Ex. 6 | Ex. 7 |
|---|---|---|---|---|---|---|---|---|
| Polymerization temperature in first polymerization step | °C. | 90 | 90 | 90 | 90 | 90 | 90 | 90 |
| Polymerization temperature in second polymerization step | °C. | 114 | 114 | 114 | 114 | 114 | 114 | 114 |
| Length of polymerization time in second polymerization step | hour | 8 | 4 | 4 | 3 | 8 | 4 | 8 |

TABLE 3-continued

|  |  | Ex. 1 | Ex. 2 | Ex. 3 | Ex. 4 | Ex. 5 | Ex. 6 | Ex. 7 |
|---|---|---|---|---|---|---|---|---|
| Weight average molecular weight (A) of copolymer at start of second polymerization step | ×10000 | 13.1 | 13.1 | 13 | 13 | 13 | 13 | 13.0 |
| Weight average molecular weight (B) of copolymer at end of second polymerization step | ×10000 | 16.2 | 16.7 | 16.9 | 16.7 | 16.1 | 17 | 15.9 |
| Weight average molecular weight (B)/weight average molecular weight (A) | — | 1.24 | 1.27 | 1.30 | 1.28 | 1.24 | 1.31 | 1.22 |
| TH/TQ ratio | — | 1.18 | 1.16 | 1.10 | 1.18 | 1.18 | 1.14 | 1.14 |

TABLE 4

|  |  | Compar. Ex. 1 | Compar. Ex. 2 | Compar. Ex. 3 | Compar. Ex. 4 | Compar. Ex. 5 | Compar. Ex. 6 | Compar. Ex. 7 | Compar. Ex. 8 |
|---|---|---|---|---|---|---|---|---|---|
| Polymerization temperature in first polymerization step | °C. | 90 | 90 | 90 | 90 | 90 | 90 | 90 | 90 |
| Polymerization temperature in second polymerization step | °C. | 114 | 102 | 114 | 114 | 114 | 114 | 114 | 114 |
| Length of polymerization time in second polymerization step | hour | 4 | 8 | 10 | 4 | 6 | 2 | 2 | 8 |
| Weight average molecular weight (A) of copolymer at start of second polymerization step | ×10000 | 13 | 14.1 | 13 | 13.5 | 12.9 | 13 | 12.9 | 28 |
| Weight average molecular weight (B) of copolymer at end of second polymerization step | ×10000 | 16.9 | 17.8 | 16.9 | 17.2 | 16.1 | 16.8 | 15.9 | 18 |
| Weight average molecular weight (B)/weight average molecular weight (A) | — | 1.30 | 1.26 | 1.30 | 1.27 | 1.25 | 1.29 | 1.23 | 0.64 |
| TH/TQ ratio | — | 1.31 | 1.29 | 1.28 | 1.33 | 1.25 | 1.21 | 1.21 | 1.08 |

TABLE 5

|  |  |  | Ex. 1 | Ex. 2 | Ex. 3 | Ex. 4 | Ex. 5 | Ex. 6 | Ex. 7 |
|---|---|---|---|---|---|---|---|---|---|
| Expandable resin particles | Styrene content | ppm | ND | 8 | 10 | 20 | ND | ND | ND |
|  | Ethylbenzene content | ppm | 62 | 65 | 65 | 68 | 127 | 67 | 64 |
|  | Acrylonitrile content | ppm | 250 | 370 | 305 | 350 | 240 | 200 | 150 |
|  | Alpha-methylstyrene content | ppm | 150 | 50 | 8 | 35 | 130 | 10 | 30 |
|  | Total VOC content | ppm | 462 | 493 | 388 | 473 | 497 | 277 | 244 |
|  | VOC content | — | G | G | G | G | G | G | G |
|  | Water content | % | 1.9 | 1.7 | 1.7 | 1.7 | 2 | 1.7 | 1.9 |
|  | Total of expanding agent content + water content | % | 5.9 | 5.8 | 5.7 | 5.7 | 5.8 | 5.9 | 6.0 |

TABLE 6

|  |  |  | Compar. Ex. 1 | Compar. Ex. 2 | Compar. Ex. 3 | Compar. Ex. 4 | Compar. Ex. 5 | Compar. Ex. 6 | Compar. Ex. 7 | Compar. Ex. 8 |
|---|---|---|---|---|---|---|---|---|---|---|
| Expandable resin particles | Styrene content | ppm | 100 | 350 | 70 | 50 | 55 | 45 | 60 | 60 |
|  | Ethylbenzene content | ppm | 65 | 66 | 67 | 68 | 67 | 68 | 68 | 67 |
|  | Acrylonitrile content | ppm | 1200 | 1700 | 980 | 450 | 350 | 480 | 0 | — |

TABLE 6-continued

|  |  | Compar. Ex. 1 | Compar. Ex. 2 | Compar. Ex. 3 | Compar. Ex. 4 | Compar. Ex. 5 | Compar. Ex. 6 | Compar. Ex. 7 | Compar. Ex. 8 |
|---|---|---|---|---|---|---|---|---|---|
| Alpha-methylstyrene content | ppm | 380 | 520 | 290 | 140 | 180 | 60 | 600 | — |
| Total VOC content | ppm | 1745 | 2836 | 1407 | 708 | 852 | 653 | 728 | 127 |
| VOC content | — | P | P | P | P | P | P | P | P |
| Water content | % | 1.6 | 1.5 | 2.3 | 1.6 | 1.8 | 1.5 | 1.4 | 0.5 |
| Total of expanding agent content + water content | % | 5.6 | 5.5 | 6.4 | 5.5 | 5.7 | 5 | 5.1 | 7.7 |

Obtained expandable resin particles were expanded at a steam pressure of 0.08 MPa to 0.12 MPa to obtain expanded particles. Further, the obtained expanded particles were molded in a mold at an adjusted steam pressure of 0.06 MPa and for a heating time of 20 seconds to obtain a foamed molded product having an expansion ratio of 40 times.

The obtained foamed molded product was subjected to the above-described various types of measurement and evaluation, results of which are shown in Tables 7 and 8.

TABLE 7

|  |  |  | Ex. 1 | Ex. 2 | Ex. 3 | Ex. 4 | Ex. 5 | Ex. 6 | Ex. 7 |
|---|---|---|---|---|---|---|---|---|---|
| Foamed molded product | Amount of styrene released | μg | 0.1 | 0.6 | 0.7 | 1.4 | 0.01 | 0.1 | 0.1 |
|  | Amount of ethylbenzene released | μg | 1.6 | 1.7 | 1.7 | 1.8 | 2.8 | 1.7 | 1.7 |
|  | Amount of acrylonitrile released | μg | 0.8 | 1.3 | 1.1 | 1.3 | 0.8 | 0.6 | 0.4 |
|  | Amount of alpha-methylstyrene released | μg | 0.1 | 0.05 | ND | 0.04 | 0.1 | ND | 0.03 |
|  | Amount of total VOC released | μg | 2.6 | 3.7 | 3.5 | 4.5 | 3.7 | 2.4 | 2.2 |
|  | Amount of VOC released | μg | G | G | G | G | G | G | G |
|  | Average cell diameter | μm | 75 | 70 | 75 | 75 | 75 | 70 | 75 |
|  | Cell uniformity | — | G | G | G | G | G | G | G |
|  | Surface property of foamed molded product | — | G | G | G | G | G | G | G |
|  | Ratio of expanded particles having uneven cells | % | 3 | 4 | 4 | 4 | 3 | 4 | 3 |
|  | Oxygen index | % | 26 | 28.8 | 28.7 | 29 | 26 | 28.5 | 26 |
| Heat resistance evaluation | Rate of dimensional change of foamed molded product at 90° C. | % | −0.25 | −0.25 | −0.28 | −0.25 | −0.27 | −0.25 | −0.25 |
|  | Expansion of foamed molded product | — | G | G | G | G | G | G | G |

TABLE 8

|  |  |  | Compar. Ex. 1 | Compar. Ex. 2 | Compar. Ex. 3 | Compar. Ex. 4 | Compar. Ex. 5 | Compar. Ex. 6 | Compar. Ex. 7 | Compar. Ex. 8 |
|---|---|---|---|---|---|---|---|---|---|---|
| Foamed molded product | Amount of styrene released | μg | 4.7 | 12.6 | 3.3 | 2.2 | 2.4 | 2 | 6.5 | 1.4 |
|  | Amount of ethylbenzene released | μg | 3.7 | 1.7 | 1.7 | 1.8 | 1.8 | 1.8 | 3.1 | 5.9 |
|  | Amount of acrylonitrile released | μg | 3 | 4.2 | 2.2 | 1.3 | 1.2 | 1.5 | 0.2 | — |
|  | Amount of alpha-methylstyrene released | μg | 0.3 | 0.5 | 0.2 | 0.1 | 0.1 | 0.1 | 0.8 | — |
|  | Amount of total VOC released | μg | 9.2 | 19.0 | 7.4 | 5.4 | 5.5 | 5.4 | 10.6 | 19.9 |
|  | Amount of VOC released | μg | P | P | P | P | P | P | P | P |
|  | Average cell diameter | μg | 80 | Expanded particles having no double cell: 65 Expanded particles having double cell: 10/75 (inner side/outer side or outer side/inner side) | 70 | 75 | 70 | 75 | 80 | 110 |
|  | Cell uniformity | — | G | P | G | G | G | G | G | G |
|  | Surface property of foamed molded product | — | G | P | G | G | G | G | G | G |
|  | Ratio of expanded particles having uneven cells | % | 4 | 50 | 2 | 4 | 4 | 7 | 8 | 0 |

TABLE 8-continued

|  |  |  | Compar. Ex. 1 | Compar. Ex. 2 | Compar. Ex. 3 | Compar. Ex. 4 | Compar. Ex. 5 | Compar. Ex. 6 | Compar. Ex. 7 | Compar. Ex. 8 |
|---|---|---|---|---|---|---|---|---|---|---|
|  | Oxygen index | % | 28.8 | 28.8 | 25 | 29 | 26.5 | 29.5 | 29 | 27 |
| Heat resistance evaluation | Rate of dimensional change of foamed molded product at 90° C. | % | −0.35 | 0.3 | −0.29 | −0.28 | −0.3 | −0.31 | −1.00 | −7.8 |
|  | Expansion of foamed molded product |  | — | G | P | G | G | G | G | G | G |

From Tables 7 and 8, it was found that the expandable resin particles and the foamed molded products of Examples 1 through 7 in accordance with one or more embodiments of the present invention were rated as "G (Good)" in all of the evaluation categories and thus met the criteria. Comparative Examples 1 through 8, on the other hand, are outside the scope of one or more embodiments of the present invention. As such, the expandable resin particles and the foamed molded products of Comparative Examples 1 through 8 were rated as "P (Poor)" in any of the evaluation categories, and thus did not meet the criteria.

According to one or more embodiments of the present invention, it is possible to provide expandable resin particles that have a reduced VOC content, a method of producing the expandable resin particles, and a foamed molded product that has reduced VOC emission. Accordingly, one or more embodiments of the present invention are suitably applicable to the fields of automobiles and building materials.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. Expandable resin particles comprising:
    a base material resin containing, as a structural unit, a styrene unit and an acrylonitrile unit; and an expanding agent,
    wherein the expandable resin particles have a styrene content of not more than 20 ppm and an ethylbenzene content of not more than 130 ppm, and
    wherein the base material resin has a TH/TQ ratio of less than 1.20.

2. The expandable resin particles as set forth in claim 1, wherein:
    (a) the base material resin further contains an alpha-methylstyrene unit as a structural unit;
    (b) an amount of the styrene unit in the base material resin is not less than 60 parts by weight and not more than 75 parts by weight, an amount of the acrylonitrile unit in the base material resin is not less than 21 parts by weight and not more than 27 parts by weight, and an amount of the alpha-methylstyrene unit in the base material resin is not less than 3 parts by weight and not more than 15 parts by weight; and
    (c) a total amount of the styrene unit, the acrylonitrile unit, and the alpha-methylstyrene unit in the base material resin is 100 parts by weight.

3. The expandable resin particles as set forth in claim 1, wherein the expandable resin particles have a water content of not less than 1%.

* * * * *

UNITED STATES PATENT AND TRADEMARK OFFICE
CERTIFICATE OF CORRECTION

| | | |
|---|---|---|
| PATENT NO. | : 11,993,669 B2 | |
| APPLICATION NO. | : 17/170101 | |
| DATED | : May 28, 2024 | |
| INVENTOR(S) | : Atsushi Iida et al. | |

It is certified that error appears in the above-identified patent and that said Letters Patent is hereby corrected as shown below:

In the Specification

At Columns 33 and 34, TABLE 3-continued, the data "– 1.18 1.16 1.10 1.18 1.18 1.14 1.14" should be positioned in the same row as TH/TQ ratio;

At Columns 35 and 36, TABLE 6-continued, the total VOC content (ppm) of Comparative Example 2 "2836" should read -- 2636 --, and the total VOC content (ppm) of Comparative Example 5 "852" should read -- 652 --;

At Columns 35 and 36, TABLE 7, the rate of dimensional change of foamed molded product at 90°C. (%) of Example 2 "-0.25" should read -- -0.26 --; and At Columns 35 and 36, TABLE 8, the amount of styrene released (μg) of Comparative Example 1 "4.7" should read -- 4.2 --, the amount of ethylbenzene released (μg) of Comparative Example 1 "3.7" should read -- 1.7 --, and the amount of styrene released (μg) of Comparative Example 8 "1.4" should read -- 14 --.

Signed and Sealed this
Twentieth Day of August, 2024

Katherine Kelly Vidal
*Director of the United States Patent and Trademark Office*